(12) United States Patent
Mukherjee et al.

(10) Patent No.: US 11,716,734 B2
(45) Date of Patent: *Aug. 1, 2023

(54) METHODS AND APPARATUS FOR COMMUNICATING UPLINK CONTROL INFORMATION

(71) Applicant: Charter Communications Operating, LLC, St. Louis, MO (US)

(72) Inventors: Amitav Mukherjee, Elk Grove, CA (US); Ahmad Reza Hedayat, Carlsbad, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,727

(22) Filed: Dec. 20, 2021

(65) Prior Publication Data
US 2022/0116939 A1     Apr. 14, 2022

Related U.S. Application Data

(63) Continuation of application No. 16/402,200, filed on May 2, 2019, now Pat. No. 11,206,642.

(51) Int. Cl.
| | | |
|---|---|---|
| H04W 72/21 | (2023.01) | |
| H04L 1/1867 | (2023.01) | |
| H04W 72/0446 | (2023.01) | |
| H04L 5/00 | (2006.01) | |

(52) U.S. Cl.
CPC .......... *H04W 72/21* (2023.01); *H04L 1/1887* (2013.01); *H04L 5/0055* (2013.01); *H04W 72/0446* (2013.01)

(58) Field of Classification Search
CPC ... H04L 5/0055; H04L 1/0026; H04L 1/1896; H04L 1/0073; H04B 7/0643
See application file for complete search history.

(56) References Cited

U.S. PATENT DOCUMENTS 11,206,642 B2 * 12/2021 Mukherjee ............ H04L 1/1822

\* cited by examiner

*Primary Examiner* — Elton Williams
(74) *Attorney, Agent, or Firm* — Straub & Straub; Michael P. Straub; Stephen T. Straub

(57) ABSTRACT

Methods and apparatus related to HARQ feedback, e.g. delayed HARQ ACK/NACK, and uplink control information (UCI) multiplexing, in unlicensed spectrum are described. A base station transmits an UCI request to a UE, including: a request for ACK/NACK feedback corresponding to a set of HARQ identified processes, a request for channel state information report, and/or a scheduling request. The UCI request includes information which is used, by the UE, in determining the time and air link resources on which to send the UCI. The HARQ processes are communicated in a first Channel Occupancy Time (COT), while the ACK/NACK feedback is communicated in a later COT.

21 Claims, 17 Drawing Sheets

DCI FIELDS FOR TYPE II CG (IN ADDITION TO PARAMETERS IN THE BASELINE SPEC)

| INDICATORS FOR ACTIVATION OF ONE OF CGs (E.G., 2 BITS IF FOUR SETS OF CG PUSCHs ARE CONFIGURED FOR A UE) | HARQ IDs BEING REPORTED (E.G., UP TO 16 BITS IF A BITMAP IS USED WITH ONE BIT PER DL HARQ ID) | INDICATION OF WHETHER SR SHOULD BE REPORTED (1 BIT) | CSI REQUEST USED TO CONTROL UCI MULTIPLEXING (E.G. UP TO 6 BITS THAT MAY FURTHER BE MAPPED TO A PRE-CONFIGURED LOOK-UP TABLE | BETA OFFSET TO CONTROL UCI ERROR CONTROL CODING (E.G., 2 BITS) | TPC COMMAND FOR CG PUSCH CARRYING DELAYED ACK/NACK AND OTHER UCI (E.G., 2 BITS) | DOWNLINK ASSIGNMENT INDEX (E.G., 2 BITS OR 4 BITS) | ... |
|---|---|---|---|---|---|---|---|
| 602 | 604 | 606 | 608 | 610 | 612 | 614 | |

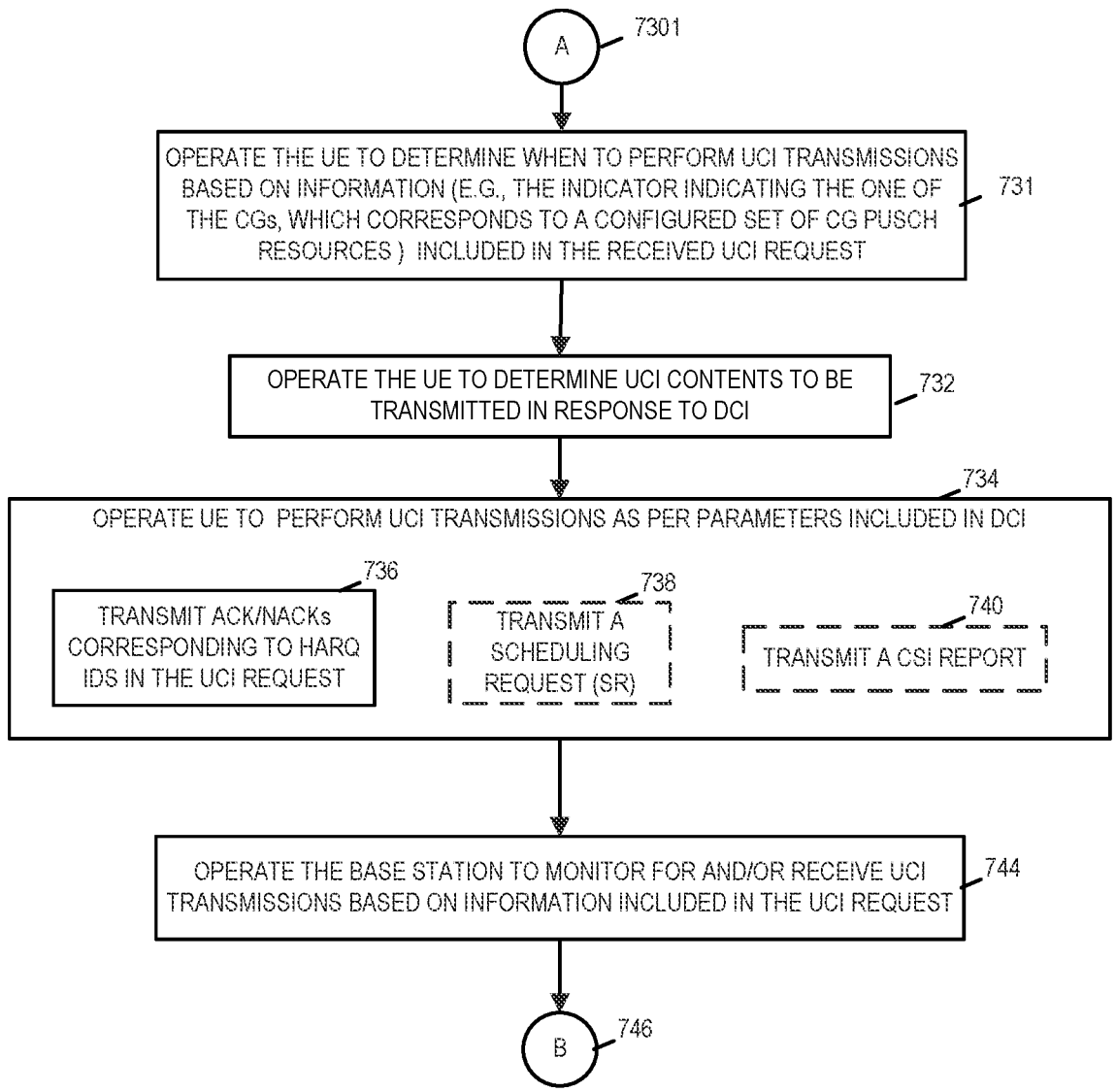

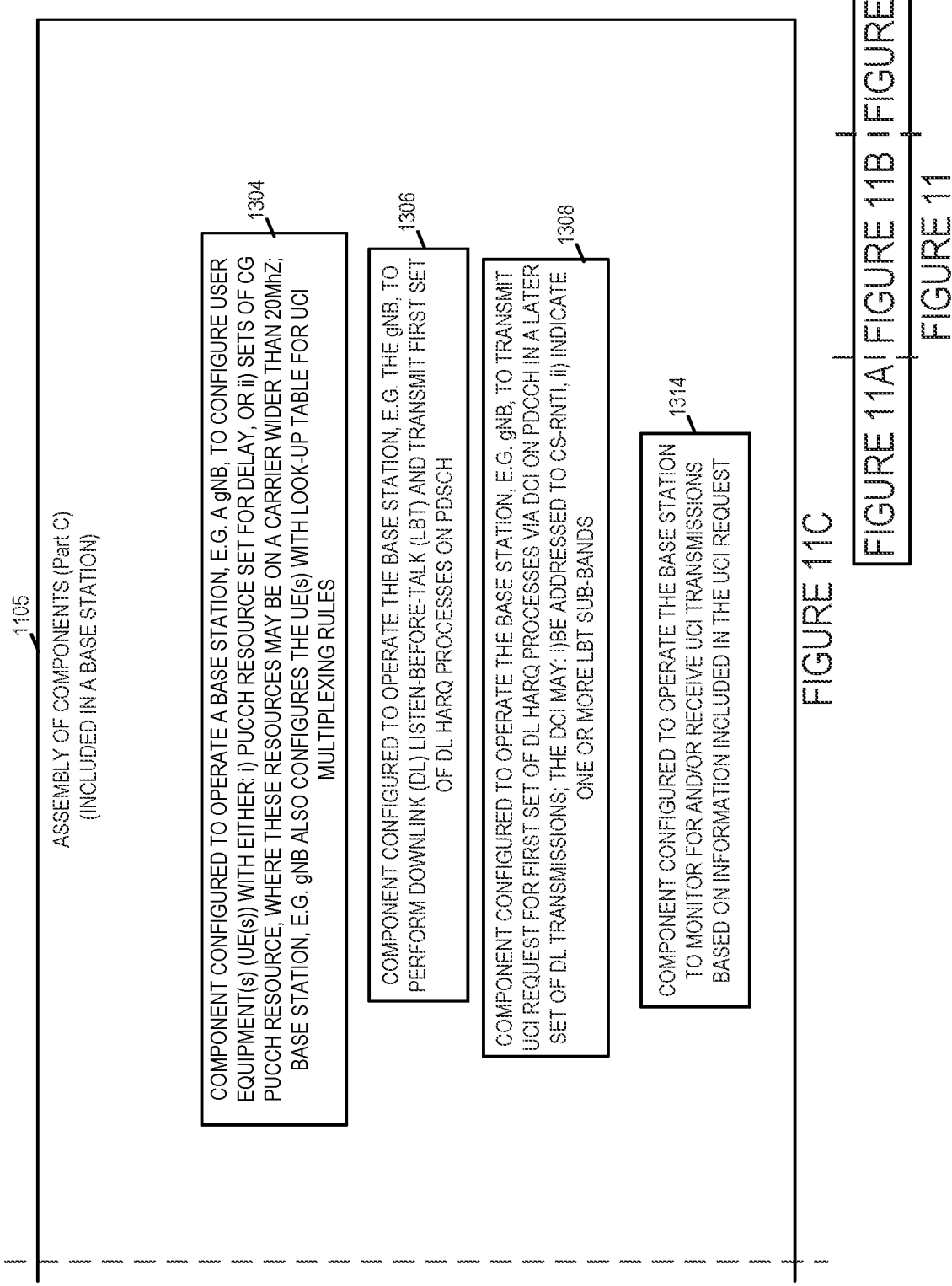

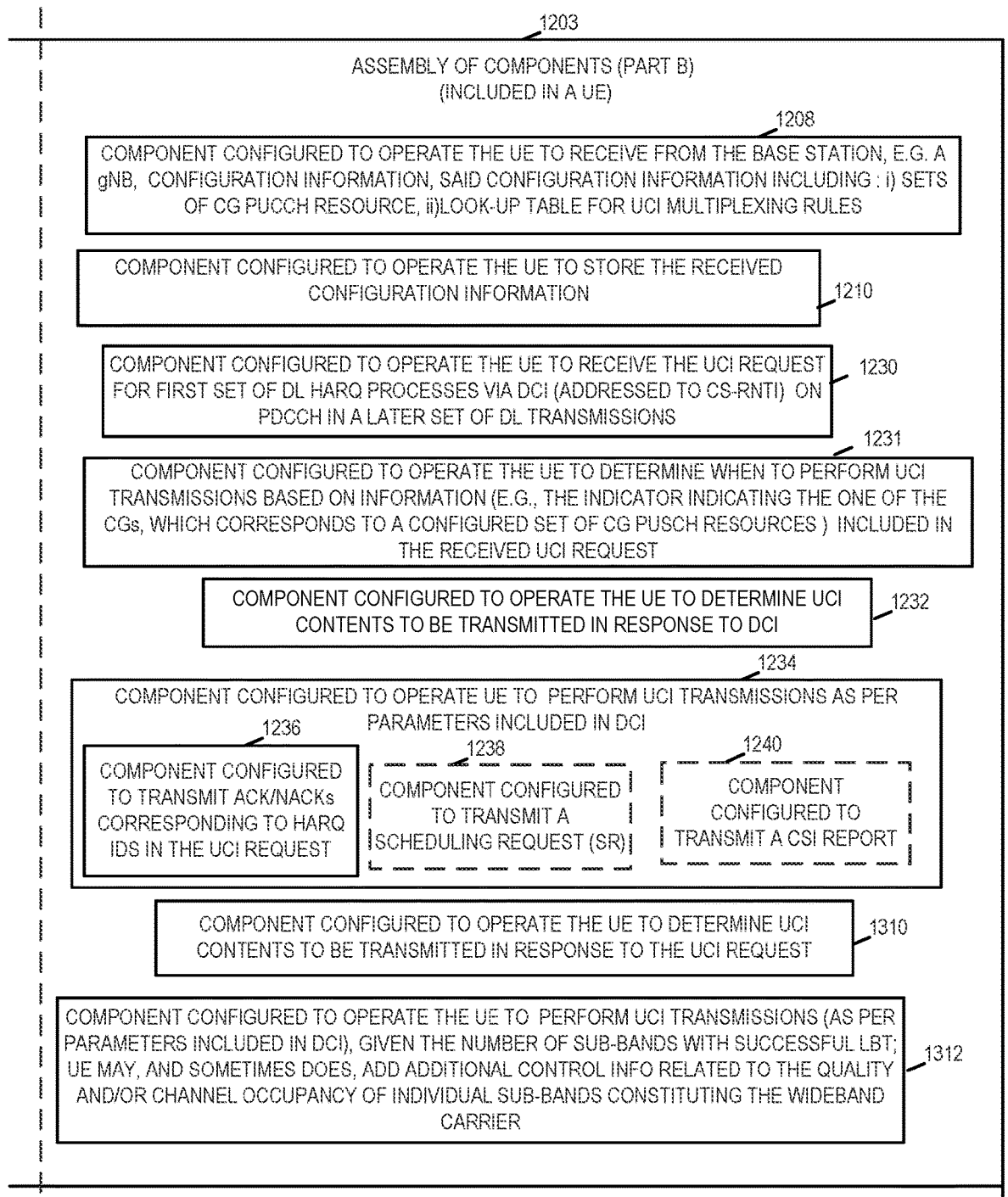

METHODS AND APPARATUS FOR COMMUNICATING UPLINK CONTROL INFORMATION

RELATED APPLICATIONS

The present application is a continuation of U.S. patent application Ser. No. 16/402,200 filed on May 5, 2019 and published as US 2020-0351861 A1 on Nov. 5, 2020, the application and application publication being hereby expressly incorporated by reference in their entirety.

FIELD

The present application relates to communications methods and apparatus, and more particularly, to methods and apparatus related to HARQ feedback, e.g. delayed HARQ ACK/NACK, and uplink control information (UCI) multiplexing, in unlicensed spectrum.

BACKGROUND

Long Term Evolution (LTE) licensed Assisted Access (LAA) and its enhancements enhanced LAA/further enhanced LAA (eLAA/FeLAA) were introduced in 3GPP Release 13-15 to specify Downlink (DL) and Uplink (UL) LTE operation in unlicensed spectrum, primarily 5 GHz. Note that LTE-LAA does not support uplink control channels.

As future systems and standards are developed for radio communications including those applicable to 5G, there is a need for methods and apparatus improved methods of controlling what information will be transmitted in the uplink and/or when particular information is communicated. As 5G, New Radio (NR) and the use of unlicensed spectrum becomes of ever greater importance there is a need for new efficient methods and apparatus for requesting and reporting uplink control information including feedback results, e.g. ACK/NACKs for an identified set of HARQ processes transmitted in during a channel occupancy time (COT).

SUMMARY

Various embodiments are directed to methods and apparatus related to uplink control information (UCI) requesting and reporting, said UCI including Hybrid Automatic Repeat Request acknowledgment/negative acknowledgment (HARQ ACK/NACKS), channel state information (CSI) reports and/or scheduling request (SRs). Various embodiments, in accordance with the present invention are well suited for use in unlicensed spectrum, e.g., new radio-unlicensed (NR-U) in which air link resources may not always be available or may only be available for short durations. Some embodiments of the present invention are directed to methods and apparatus to control uplink control information (UCI) multiplexing, for example, such as CSI and/or SR together with HARQ ACK/NACK, e.g., delayed ACK/NACK, for the new feedback opportunities introduced in REL-16 NR-U. In some embodiments, novel features allow a base station, e.g. a gNB, to control the UCI payload size of the UE and the timing of the UCI feedback with greater granularity.

An exemplary communications method, in accordance with some embodiments, comprises: operating a base station, e.g., a gNB, to transmit an uplink control information (UCI) request in a Physical Downlink Control Channel (PDCCH) to a User Equipment (UE), said UCI request requesting transmission of HARQ acknowledgment information for one or more previously communicated transmission segments identified by HARQ IDs included in the UCI request and including an indication of information to be multiplexed with HARQ acknowledgement information; and operating the base station to monitor for uplink control information including HARQ information from the UE.

An exemplary base station, e.g., gNB, in accordance with some embodiments, comprises a wireless transmitter; a wireless receiver; and a processor configured to: operate the base station to transmit, e.g., via the wireless transmitter, an uplink control information (UCI) request in a Physical Downlink Control Channel (PDCCH) to a User Equipment (UE), said UCI request requesting transmission of HARQ acknowledgment information for one or more previously communicated transmission segments identified by HARQ IDs included in the UCI request and including an indication of information to be multiplexed with HARQ acknowledgement information; and operate the base station to monitor for uplink control information including HARQ information from the UE.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 6 illustrates drawing of exemplary DCI fields (Indications for activation of one of CGs field, HARQ IDs being Reported Field, Indication of whether SR should be reported field, CSI Request used to control UCI multiplexing Field, Beta Offset Field, TPC command field, Downlink Assignment index field) included in an exemplary DCI format message used in the case of TYPE II CG to convey an UCI request.

FIG. 7B is a second part of a flowchart of an exemplary communications method in accordance with an exemplary embodiment.

FIG. 7 comprises the combination of FIG. 7A and FIG. 7B.

FIG. 11C is a drawing of a third part of an exemplary assembly of components, which may be included in an exemplary base station in accordance with an exemplary embodiment.

FIG. 11 comprises the combination of FIG. 11A, FIG. 11B and FIG. 11C.

FIG. 12B is a drawing of a second part of an exemplary assembly of components, which may be included in an exemplary user equipment (UE), in accordance with an exemplary embodiment.

FIG. 12 comprises the combination of FIG. 12A and FIG. 12B.

DETAILED DESCRIPTION

Figure 1:
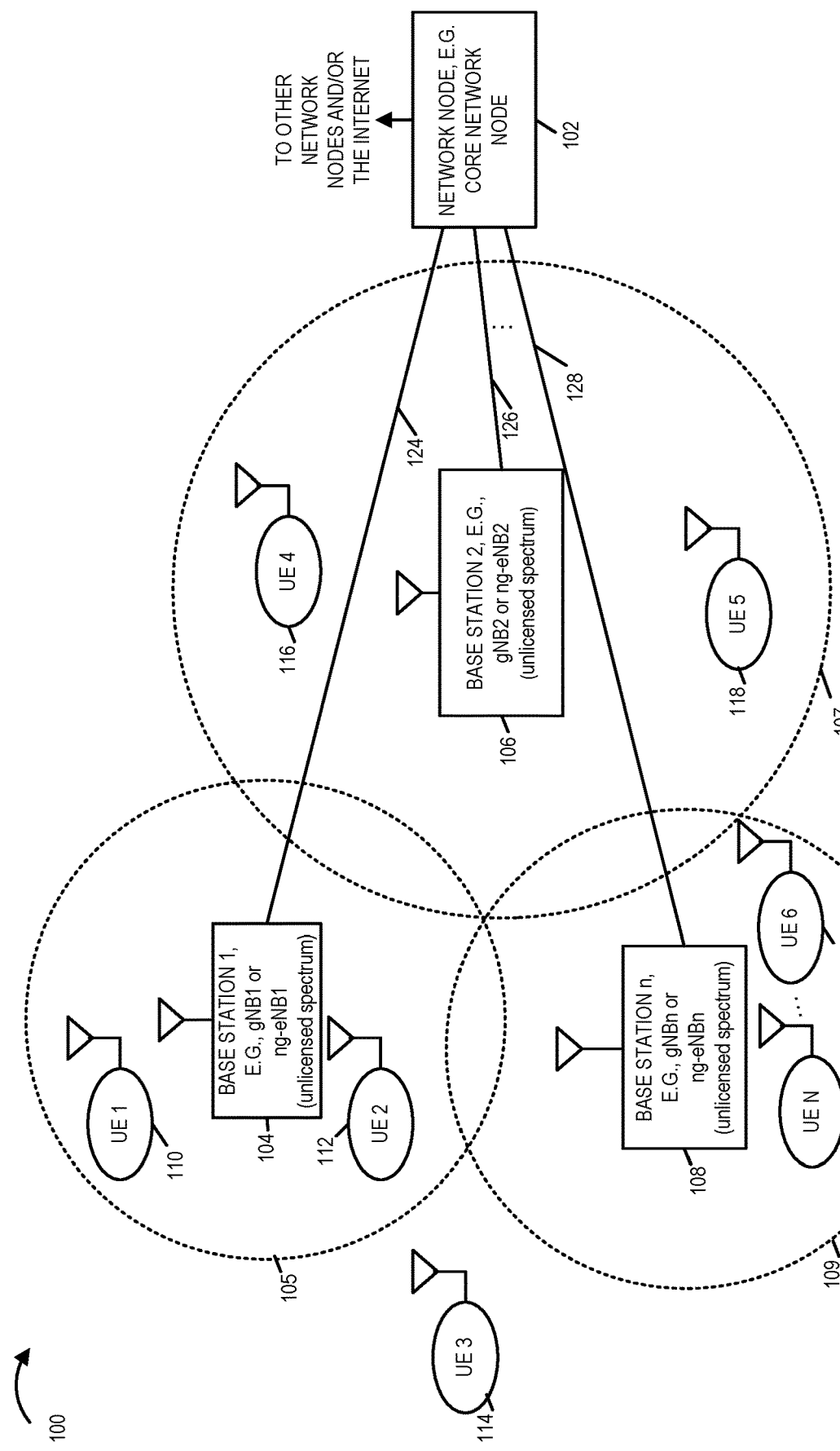
FIG. 1 is a drawing of an exemplary communications system, which supports novel uplink control information (UCI) requests in unlicensed spectrum in a physical downlink control channel (PDCCH) to a UE, in accordance with an exemplary embodiment.

FIG. 1 is a drawing of an exemplary communications system 100, which supports novel uplink control information (UCI) requests in unlicensed spectrum in a physical downlink control channel (PDCCH) to a UE, in accordance with an exemplary embodiment. The UCI request, which in some embodiments is a command, may, and sometimes does, convey a request for identified HARQ ACK/NACKs, e.g., a request for delayed ACK/NACKs from a UE corresponding to identified HARQ process identifiers included in the request, a request for a channel state information (CSI) report, and/or a scheduling request (SR). In some embodiments, the UCI request is via downlink control information (DCI) in the Physical Downlink Control channel, and the UCI request is requesting the UE to transmit the HARQ acknowledgment in a Physical Uplink Shared Channel (PUSCH). In some such embodiments, a timing indicator in a timing indicator field of the UCI request is used to indicate which slot to transmit the UCI. In some embodiments, the UCI request is via downlink control information (DCI) addressed to a Configured Scheduling-Radio Network Temporary Identifier (CS-RNTI) in the Physical Downlink Control channel (PDCCH), and the UCI request is requesting the UE to transmit HARQ acknowledgment in the Configured Grant Physical Uplink Shared Channel (PUSCH). In some such embodiments, indicators included in an activation field are used for activating one of the configured grants, which is used to identify uplink resources to be used to communicate the UCI.

Exemplary communications system 100 includes a network node 102, e.g., a core network node, a plurality of base stations (base station 1 104, e.g., gNB 1 or ng-eNB 1, base station 2 106, e.g., gNB 2 or ng-eNB 2, . . . , base station n 108, e.g., gNBn or ng-eNBn), and a plurality of user equipment (UE) devices (UE 1 110, UE 2 112, UE 3 114, UE 4 116, UE 5 118, UE 6 120, . . . , UE N 122). Each of the base stations (base station 1 104, base station 2 106, . . . , base station n 108) has a corresponding wireless coverage area (105, 107, . . . , 109), respectively. Network node 102 is coupled to base station 1 104 via communications connection 124. Network node 102 is coupled to base station 2 106 via communications connection 126. Network node 102 is coupled to base station n 108 via communications connection 128. The base stations (104, 106, . . . , 108) use unlicensed spectrum. In some embodiments, the different base stations (104, 106, . . . , 108) use different bandwidth portions, e.g., different non-overlapping bandwidth portions, of unlicensed spectrum. In some embodiments, a bandwidth portion of unlicensed spectrum is 20 MHz. In some embodiments, a bandwidth portion of unlicensed spectrum includes a plurality of sub-bands. In some such embodiments, each sub-band in a bandwidth portion is 20 MHz.

At least some of the UE devices (110, 112, 114, 116, 118, 120, . . . , 122) are mobile devices which may move throughout the communications system 100. In the drawing of FIG. 1, UE 1 110 and UE 2 112 are shown to be currently within the wireless coverage area 105 of base station 1 104. UE 3 114 is shown to be currently outside the coverage areas (105, 107, 109) of the base stations. UE 4 116 and UE 5 118 are shown to be currently within the wireless coverage area 107 of base station 2 106. UE 6 120 and UE N 122 are shown to be currently within the wireless coverage area 109 of base station 3 108.

Figure 2:
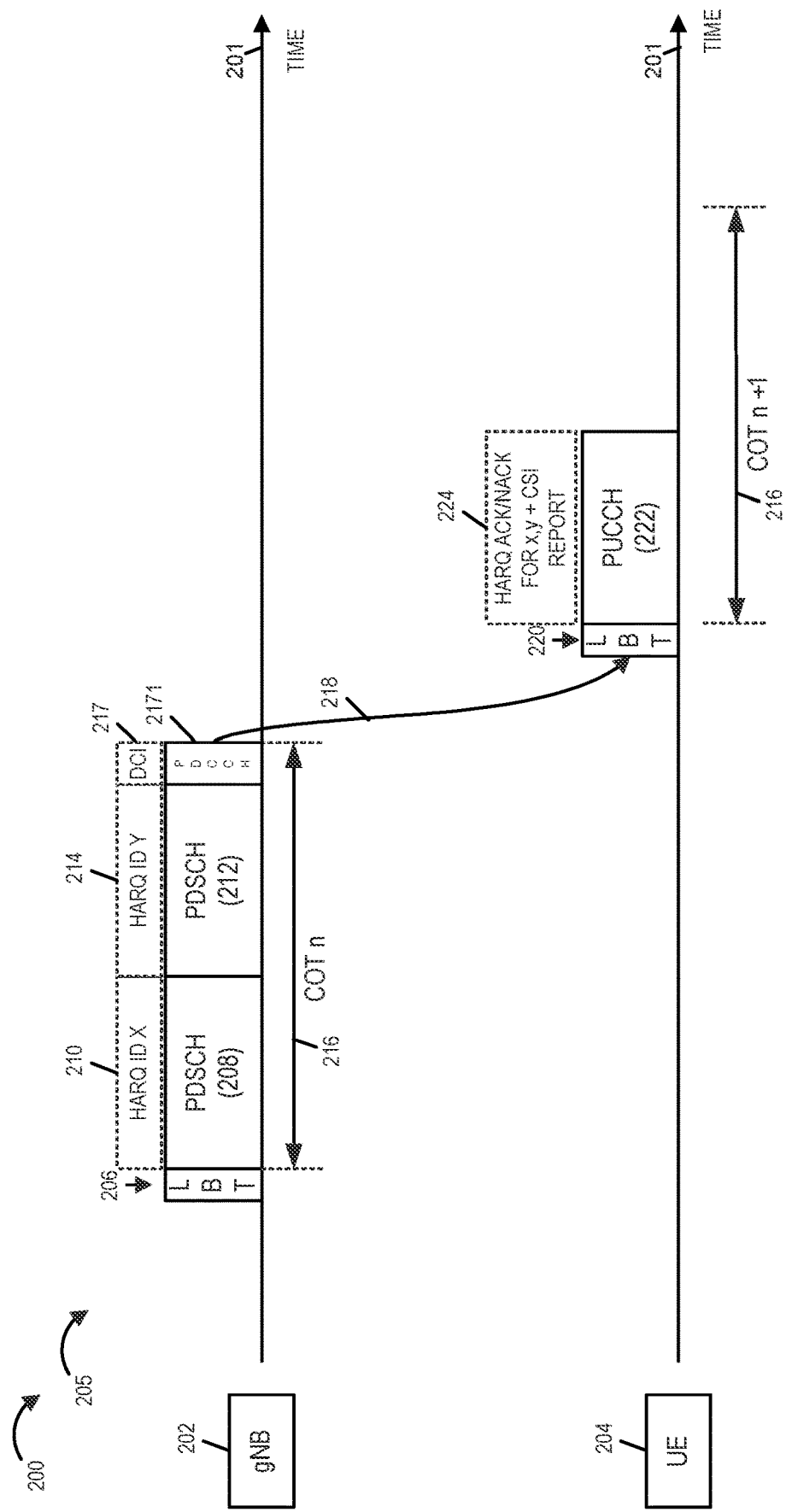
FIG. 2 is a drawing which includes an exemplary base station, a gNB, an exemplary UE, and exemplary signaling, in accordance with an exemplary embodiment.

In some exemplary embodiments, a downlink indication (e.g. downlink control information or DCI) that triggers a delayed HARQ ACK/NACK feedback from a UE also includes one or more bits to indicate whether and what form of CSI feedback can be multiplexed in the same feedback instance. In one example, the UE may transmit the indicated information on Physical Uplink Control Channel (PUCCH), as shown in FIG. 2, where the Downlink Control Information (DCI) in the last slot of COT n provides the timing and multiplexing information for the feedback in COT n+1. In another example, the indicated UCI may be multiplexed with a PUSCH transmission for which the UE has received an uplink grant.

Furthermore, a gNB may change the beta offset to increase channel redundancy for the UCI, and/or may change associated indications within the DCI so the UE either sends the delayed HARQ A/Ns only or multiplexes a partial CSI report (e.g., CSI part 1 only).

FIG. 2 is a drawing 200 which includes an exemplary base station, gNB 202, an exemplary UE 204, and exemplary signaling 205, in accordance with an exemplary embodiment. Horizontal axis 201 represents time. Exemplary UE 204 is, e.g., UE 110 of FIG. 1 or UE 1000 of FIG. 10. Exemplary base station 202 is, e.g., base station 104 of FIG. 1 or base station 900 of FIG. 9. Exemplary gNB 202 performs LTB 206, followed by PDSCH 208 and PDSCH 212. PDSCH 208 communicates HARQ ID x process 210 and PDSCH 212 communicates HARQ ID y process 214, which are included in COT n 216. The DCI 217 in the Physical Downlink Control Channel 2171 of the last slot of COT n 216 communicates the UCI request including timing and multiplexing information for the feedback to be in COT n+1 226, as indicated by arrow 218 and block 224.

In COT n+1 226, UE 204, performs LBT 220 and then transmits UCI in PUCCH 222, which, communicates HARQ ACK/NACK for x, +a CSI report, as indicated by block 224.

Figure 3:
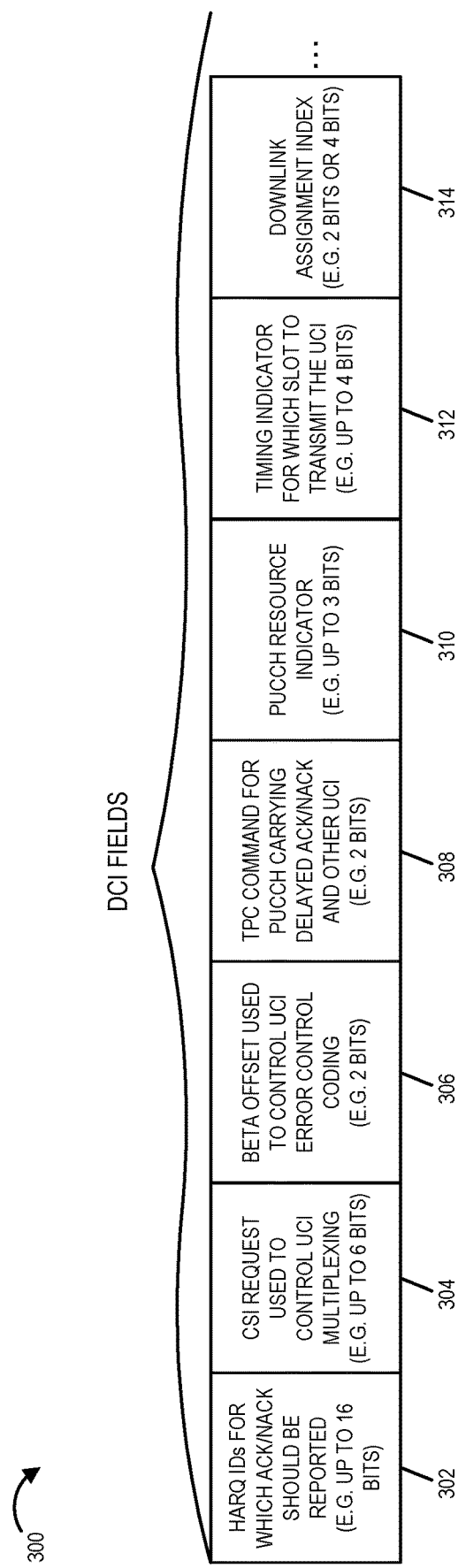
FIG. 3 illustrates drawing of exemplary DCI fields (HARQ IDs Field, CSI Request Field, Beta Offset Field, TPC command Field, PUCCH resource indicator field, Timing indicator field, Downlink Assignment index field) included in an exemplary UCI request in accordance with an exemplary embodiment.

FIG. 3 illustrates drawing 300 of exemplary DCI fields (HARQ IDs Field 302, CSI Request Field 304, Beta Offset Field 306, TPC command Field 308, PUCCH resource indicator field 310, Timing indicator field 312, Downlink Assignment index field 314) included in an exemplary UCI request in accordance with an exemplary embodiment.

A non-limiting example of the contents of an exemplary DCI Format used to control UCI multiplexing, in some embodiments, is provided in FIG. 3 and described in detail below. It should be understood that this is not a comprehensive list of all potential fields of such a DCI format.

Dci Fields:
HARQ IDs for which ACK/NACK should be reported (e.g., up to 16 bits if a bitmap is used with one bit per DL HARQ ID) are included in the HARQ ID field 302.
CSI request used to control UCI multiplexing (e.g., up to 6 bits that may further be mapped to a pre-configured look-up table) is included in the CSI request field 304.
Beta offset to control UCE error control coding (e.g., 2 bits) is included in the Beta offset field 306
Transmit Power Control (TPC) command for PUCCH carrying delayed ACK/NACK and other UCI (e.g. 2 bits) is conveyed in the TOC command field 308.
PUCCH resource indicator (e.g., up to 3 bits) is conveyed in the PUCCH resource field.
Timing indicator for which slot to transmit the UCE (e.g., up to 4 bits) is conveyed in the timing indicator field 312.
Downlink Assignment index (e.g., 2 bits or 4 bits) is conveyed in the downlink assignment index field 314.

Figure 4A:
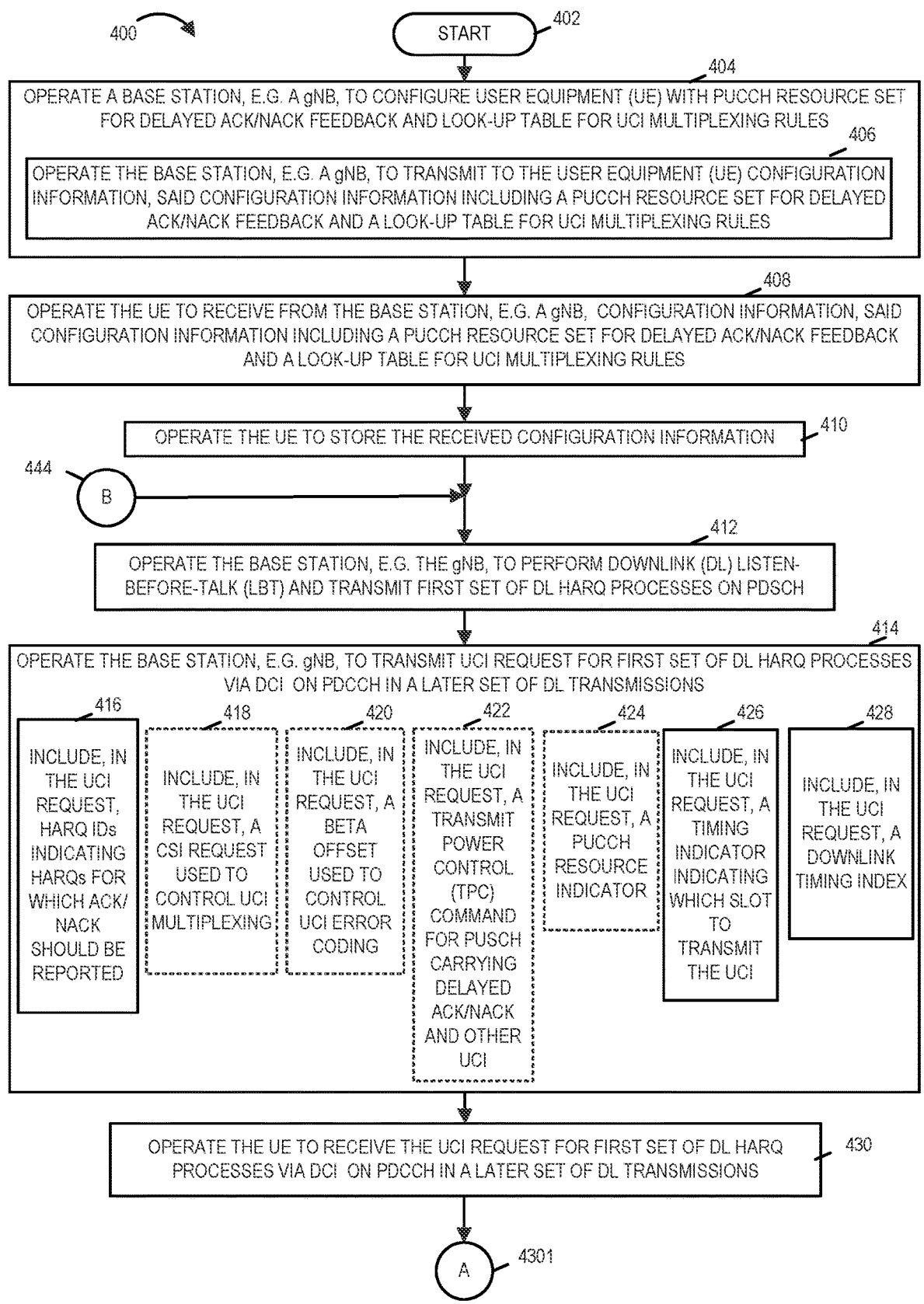
FIG. 4A is a first part of flowchart of an exemplary communications method in accordance with an exemplary embodiment.
Figures 4, 4A, 4B:
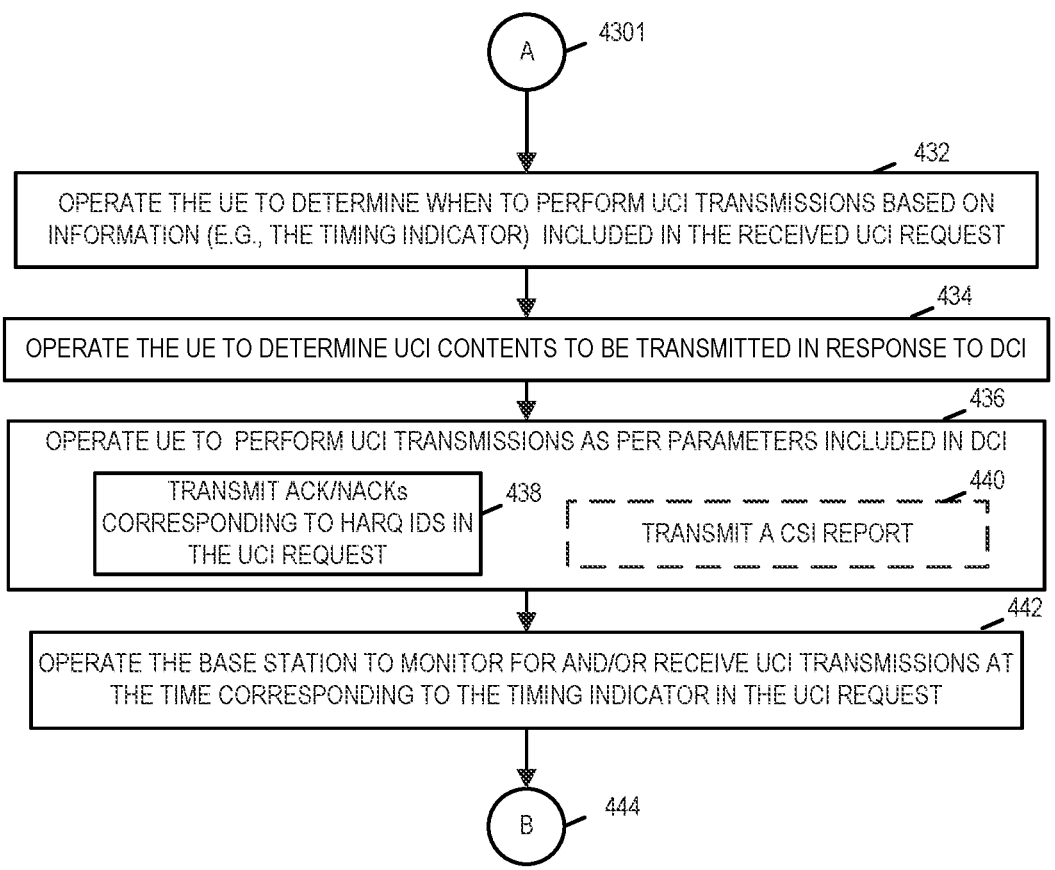
FIG. 4B is a second part of flowchart of an exemplary communications method in accordance with an exemplary embodiment.
FIG. 4 comprises the combination of FIG. 4A and FIG. 4B.

FIG. 4, comprising the combination of FIG. 4A and FIG. 4B, is a flowchart 400 of an exemplary communications method in accordance with an exemplary embodiment. Flowchart 400 depicts exemplary base station, e.g. gNB, -user equipment (UE) interactions, e.g., base station 1 104 and UE 1 110 interactions, in accordance with an exemplary embodiment. Operation of the exemplary method starts in step 402 in which the communications system, e.g. communications system 100 of FIG. 1, is powered on and initialized, e.g., communications devices including base station 1 104 and UE 1 110 are powered on and initialized. Operation proceeds from step 402 to step 404.

In step 404, the base station, e.g. gNB, configures a user equipment (UE) with a Physical Uplink Control Channel (PUCCH) resource set for delayed ACK/NACK feedback and a look-up table for Uplink Control Information (UCI) multiplexing rules. Step 404 includes step 406 in which the base station, e.g., gNB, transmits to the UE configuration information, said configuration information including a PUCCH resource set for delayed ACK/NACK feedback and a look-up table for UCI multiplexing rules. Operation proceeds from step 404 to step 408.

In step 408 the UE receives from the base station said configuration information, said configuration information including a PUCCH resource set for delayed ACK/NACK feedback and a look-up table for UCI multiplexing rules. Operation proceeds from step 408 to step 410. In step 410 the UE stores the received configuration information. Operation proceeds from step 410 to step 412.

In step 412 the base station, e.g. gNB, performs downlink (DL) listen-before-talk (LBT) and transmits a first set of DL HARQ processes on Physical Downlink Shared Channel (PDSCH). Operation proceeds from step 412 to step 414.

In step 414 the base station, e.g. gNB, transmits uplink control information (UCI) request for the first set of DL HARQ processes via Downlink Control Information (DCI) on Physical Downlink Control Channel (PDCCH) in a later set of DL transmissions. Step 414 includes steps 416, and 426, and in some embodiments, includes one or more or all of steps 418, 420, 422, 424, and 428. In step 416 the base station includes HARQ IDs in the UCI request indicating HARQs for which ACK/NACK should be reported. In step 426 the base station includes, in the UCI request, a timing indicator indicating which slot to transmit the UCI. In step 418 the base station includes in the UCI request, a CS request used to control UCI multiplexing. In step 420 the base station includes, in the UCI request, a BETA offset used to control UCI error coding. In step 422 the base station includes, in the UCI request, a transmit power control (TPC) command for PUSCH carrying the delayed ACK/NACK and other UCI. In step 424 the base station includes, in the UCI request, a PUCCH resource indicator. In step 428 the base station includes, in the UCI request, a downlink timing index. Operation proceeds from step 414 to step 430.

In step 430 the UE receives the UCI request for the first set of DL HARQ processes via DCI on PDCCH in a later set of DL transmissions. In some embodiments, the UCI request is communicated in the same COT as the HARQ processes for which ACK/NACK is being requested, e.g., at the end of the COT, e.g., as shown in FIG. 2. In some embodiments, the UCI request is communicated in a different COT than the COT in which the HARQ processes for which ACK/NACK is being requested, e.g., the next COT. Operation proceeds from step 430 to step 432.

In step 432 the UE determines when to perform UCI transmissions based on information, e.g. the timing indicator, e.g., included in the received UCI request, e.g., the timing indicator included in timing indicator field 312 of FIG. 3. Operation proceeds from step 432 to step 434.

In step 434 the UE determines uplink control information (UCI) contents to be transmitted in response to the DCI. Operation proceeds from step 434 to step 436.

In step 436 the UE performs uplink control information (UCI) transmissions as per parameters includes in Downlink Control Information (DCI) of the received UCI request, e.g. communicating the requested information at the timing indicator indicated time. Step 436 includes step 438, in which the base station transmits ACK/NACKs corresponding to HARQ IDs. In some embodiments, step 426 may, and sometimes does, include step 440, in which the base station transmit a channel state information (CSI) report. Operation proceeds from step 436 to step 442.

In step 442 the base station monitors for and/or receives UCI transmissions including HARQ information at the time corresponding to the timing indicator in the UCI request. Thus in step 442 the base station monitors for and/or receives uplink control information including HARQ information from the UE. Operation proceeds from step 442 to the input of step 412.

In some embodiments, the delayed ACK/NACK feedback that is potentially multiplexed with other UCI is transmitted on a configured grant (CG) Physical Uplink Shared Channel (PUSCH), with or without uplink-shared channel (UL-SCH). The parameters for a CG PUSCH transmission (such as time-frequency resources, periodicity, Modulation and Coding Scheme (MCS), etc.) are wholly (Type 1 CG) or partially (Type II) pre-defined by higher layer signaling.

For Type I CG, the UCI multiplexing rules may be, and sometimes are, defined semi-statically where the configured grant (CG) is configured.

Figure 5:
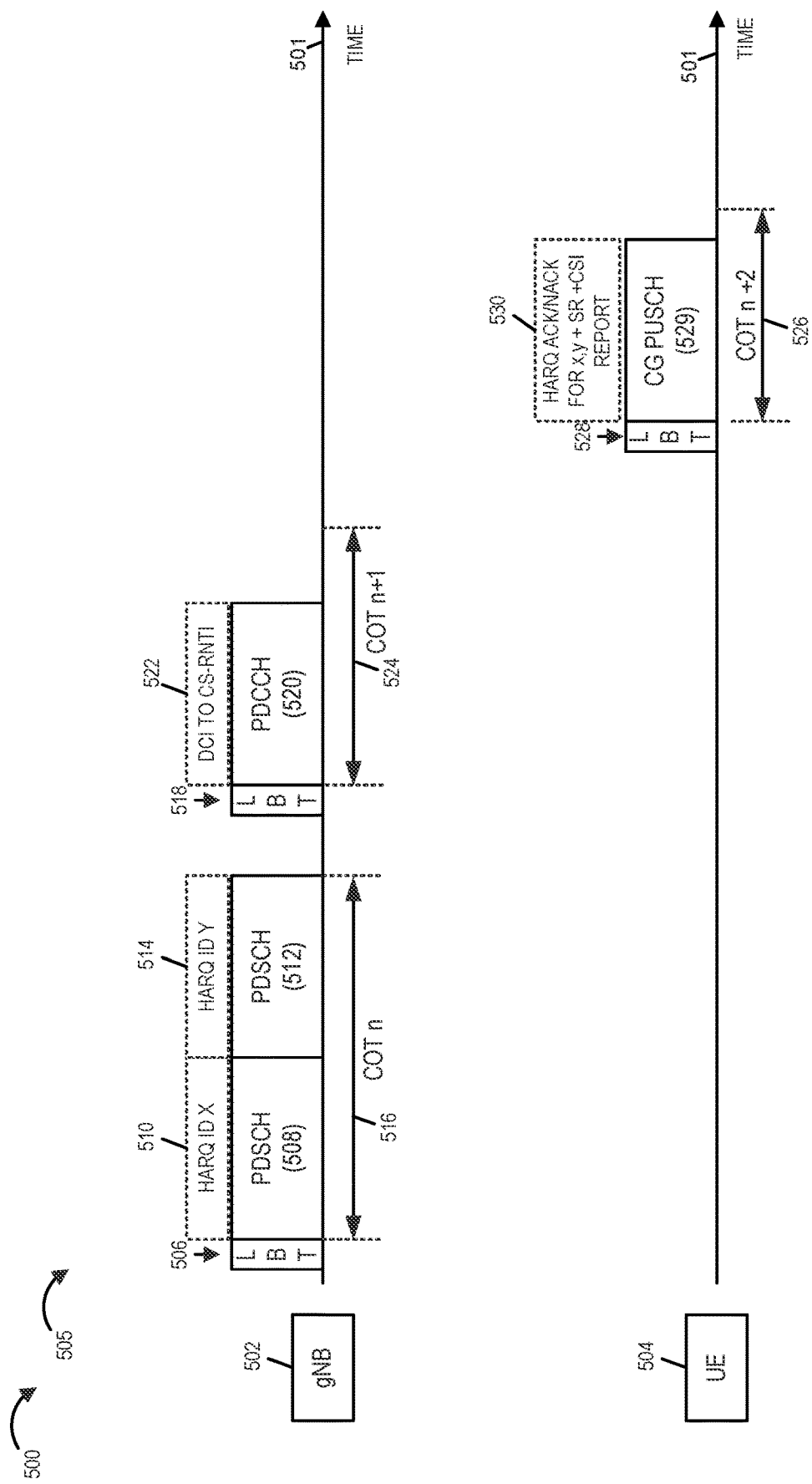
FIG. 5 is a drawing including an exemplary base station, e.g. a gNB, an exemplary UE, and exemplary signaling, in accordance with an exemplary embodiment.

For a type-II CG, in accordance with a feature of some novel embodiments, the triggering Downlink Control Information (DCI) addressed to Configured Scheduling-Radio Network Temporary Identifier (CS-RNTI) also indicates what kind of uplink control information (UCI) multiplexing may be performed on the CG PUSCH for ACK/NACK feedback corresponding to a previous COT, as shown in FIG. 5.

For both types of CG, the CG-UCI accompanying the PUSCH may indicate to the base station, e.g. gNB, whether the CG PUSCH has been multiplexed with UCI, and what are the contents of said UCI.

FIG. 5 is a drawing 500 including an exemplary base station, gNB 502, an exemplary UE 504, and exemplary signaling 505, in accordance with an exemplary embodiment. Horizontal axis 501 represents time. Exemplary UE 504 is, e.g., UE 110 of FIG. 1 or UE 1000 of FIG. 10. Exemplary base station 502 is, e.g., base station 104 of FIG. 1 or base station 900 of FIG. 9. Exemplary gNB 502 performs LTB 506, followed by PDSCH 508 and PDSCH 512. PDSCH 508 communicates HARQ ID x process 510 and PDSCH 512 communicates HARQ ID y process 514, which are included in COT n 516.

Exemplary gNB 502 performs LTB 518, followed by PDCCH 520, which communicates DCI to CS-RNTI 522, conveying an UCI request, which is included in COT n+1 524.

In COT n+2 526, UE 504, performs LBT 528 and then transmits UCI in CG PUSCH 529, which, communicates HARQ ACK/NACK for x, +a scheduling request (SR)+a CSI report, as indicated by block 530.

Furthermore, in the case of NACK for CG PUSCH that carries delayed HARQ Acknowledgment/Negative Acknowledgment (A/N)s, Scheduling Request (SR) and Channel State Information (CSI) report, the UE may, and sometimes does, change the beta offset to increase channel redundancy for UCI and/or may, and sometimes does, change associated indications with the UCI so that the UE either sends the delayed HARQ A/Ns only or multiplexes a partial CSI report. The above change in UCI multiplexing rules (in case of NACK) may be semi-statically defined or may be indicated within the DCI addressed to CS-RNTI; otherwise, the CG-UCI accompanying the PUSCH indicates whether CSI has been multiplexed.

For Type 1 CG, the changes in the RRC configuration [TS 38.331] for the ConfiguredGrantConfig information element are exemplified below:

| | |
|---|---|
| CG-UCI-ONPUSCH::= Choice { | |
| dynamic | SEQUENCE (SIZE (1..4) OF BetaOffsets, |
| semiStatic BetaOffsets | |
| UCI multiplexing | ENUMERATED {HARQ ACK-NACK only, |
| ACK-NACK and CSI part 1, | ACK-NACK and CSI part 1 and part 2} |
| MaxUCI payload | INTEGER {1.128} |
| } | |

The parameters for a CG PUSCH transmission are partially pre-defined by higher-layer signaling in case of CG Type II, and the remaining parameters are defined by a DCI.

A non-limiting example of the contents of a DCI format used in the case of Type II CG to control UCI multiplexing in this exemplary embodiment is described below and shown in FIG. 6. It should be understood that this is not a comprehensive list of all potential fields if a DCI format. The DCI is addressed to CS-RNTI.

DCI fields for type II CG (in addition to parameters in the baseline spec):

Indications for activation of one of the CGs (e.g., 2 bits if four sets of CG PUSCHs are configured for a UE) are included in Indications for activation of one of CGs field 602.

HARQ IDs being reported (e.g., up to 16 bits if a bitmap is used with one bit per DL HARQ ID) are included in HARQ IDs being Reported Field 604.

Indication of whether Scheduling Request (SR) should be reported (1 bit) is included in Indication of whether SR should be reported field 606.

CSI request used to control UCI multiplexing (e.g., up to 6 bits that may further be mapped to a pre-configured look-up table) is included in CSI Request used to control UCI multiplexing Field 608.

Beta offset to control UCE error control coding (e.g., 2 bits) is included in Beta offset field 610.

Transmit Power Control (TPC) command for CG PUSCH carrying delayed ACK/NACK and other UCI (e.g., 2 bits) is included in TPC command field 612.

Downlink assignment index (e.g., 2 bits or 4 bits) is included in Downlink assignment index field 614.

FIG. 6 illustrates drawing 600 of exemplary DCI fields (Indications for activation of one of CGs field 602, HARQ IDs being Reported Field 604, Indication of whether SR should be reported field 606, CSI Request used to control UCI multiplexing Field 608, Beta Offset Field 610, TPC command field 612, Downlink Assignment index field 614) included in an exemplary DCI format message used in the case of TYPE II CG to convey an UCI request.

Figure 7A:
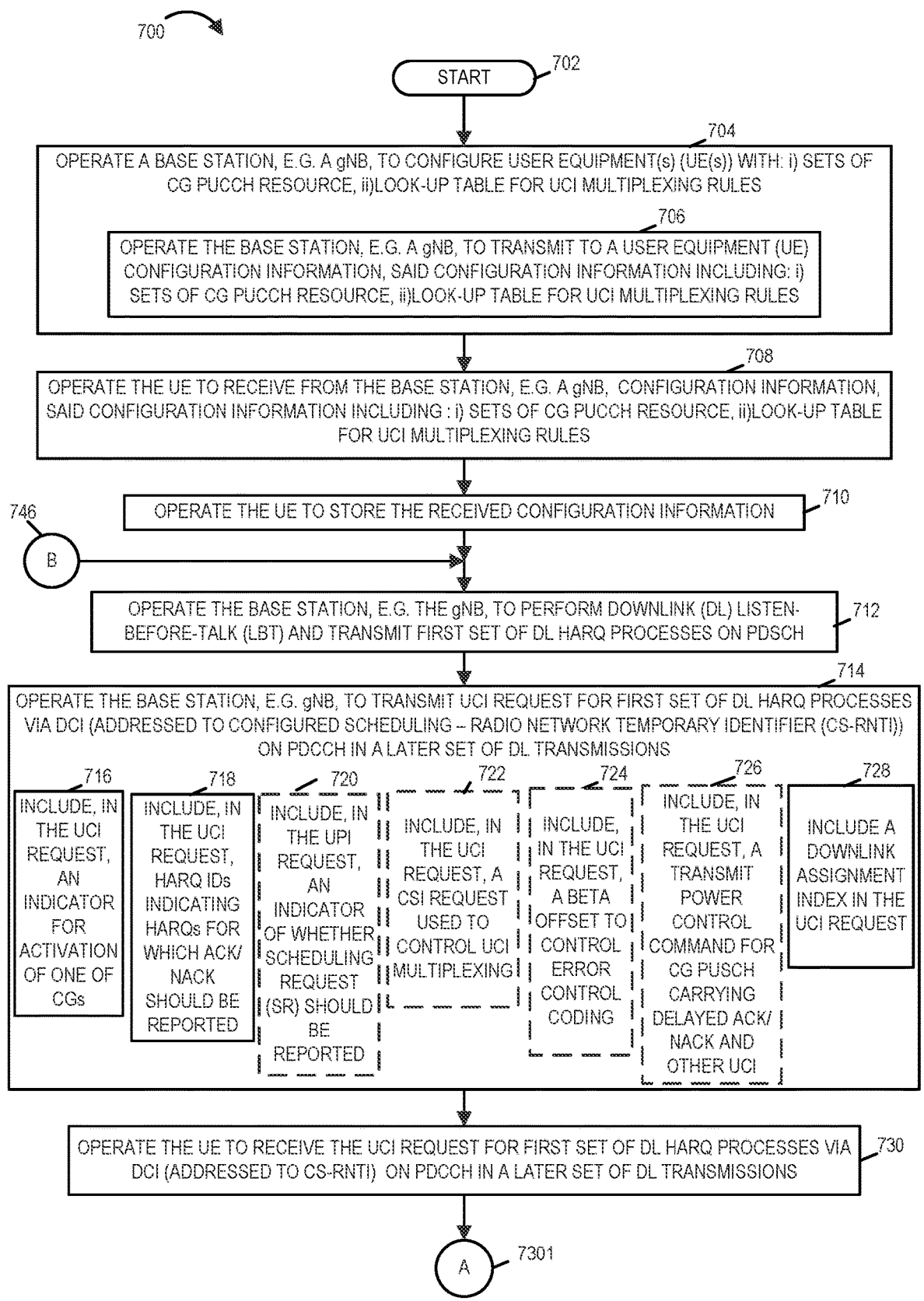
FIG. 7A is a first part of a flowchart of an exemplary communications method in accordance with an exemplary embodiment.

FIG. 7, comprising the combination of FIG. 7A and FIG. 7B, is a flowchart 700 of an exemplary communications method in accordance with an exemplary embodiment. Flowchart 700 depicts base station, e.g. gNB, -user equipment (UE) interactions, e.g., base station 1 104-UE 1 110 interactions, in accordance with an exemplary embodiment. Operation of the exemplary method starts in step 702 in which the communications system, e.g. communications system 100 of FIG. 1, is powered on and initialized, e.g., communications devices including base station 104 and UE 110 are powered on and initialized. Operation proceeds from step 702 to step 704.

In step 704, the base station, e.g. gNB, configures user equipments (UEs) with: i) sets of Configured Grant Physical Uplink Control Channel (CG PUCCH) resource and ii) look-up table for Uplink Control Information (UCI) multiplexing rules. Step 704 includes step 706 in which the base station, transmits to a UE configuration information, said configuration information including sets of Configured Grant Physical Uplink Control Channel (CG PUCCH) resource and ii) look-up table for Uplink Control Information (UCI) multiplexing rules. Operation proceeds from step 704 to step 708.

In step 708 the UE receives from the base station configuration information, said configuration information including sets of Configured Grant Physical Uplink Control Channel (CG PUCCH) resource and ii) look-up table for Uplink Control Information (UCI) multiplexing rules. Operation proceeds from step 708 to step 710.

In step 710 the UE stores the received configuration information. Operation proceeds from step 710 to step 712.

In step 712 the base station, e.g. gNB, performs downlink (DL) listen-before-talk (LBT) and transmits a first set of DL HARQ processes on Physical Downlink Shared Channel (PDSCH). Operation proceeds from step 712 to step 714.

In step 714 the base station, e.g. gNB, transmits an uplink control information (UCI) request for the first set of DL HARQ processes via Downlink Control Information (DCI) (addressed to Configured Scheduling-Radio Network Temporary Identifier (CS-RNTI)) on Physical Downlink Control Channel (PDCCH) in a later set of DL transmissions. In some embodiments, the DL HARQ processes for which ACK/NACK is being requested are communicated in a first COT and the UCI request is communicated on a second COT, e.g. as shown in FIG. 5.

Step 714 includes steps 716, 718 and 728. In some embodiments, step 714 includes one or more or all of steps 720, 722, 724 and 726. In step 716 the base station includes, in the UCI request, an indicator for activation of one of the CGs. In step 718 the base station includes, in the UCI request, HARQ IDs indicating HARQs for which ACK/NACK should be reported. In step 728 the base station includes a downlink assignment index in the UCI request. In step 720 the base station includes, in the UCI request an indication of whether e a scheduling request (SR) should be reported. In step 722 the base station includes, in the UCI request, a CIS request used to control multiplexing. In step 724, the base station includes, in the UCI request, a beta offset used to control error control coding. In step 726 the base station includes, in the UCI request, a transmit power control (TPC) command for CG PUSCH carrying delayed ACK/NACK and other UCI. Operation proceeds from step 714 to step 730.

In step 730 the UE receives the UCI request for the first set of DL HARQ processes via DCI, addressed to CS-RNTI, on PDCCH in a later set of transmissions. Operation proceeds from step 730, via connecting node A 7301, to step 731 in which the UE determines when to perform UCI transmission based on information, e.g., the indicator indicating the one of the CGs, which corresponds to a configured set of CG PUSCH resources, included in the received UCI request. Operation proceeds from step 731 to step 732.

In step 732 the UE determines uplink control information (UCI) contents to be transmitted in response to the DCI. Operation proceeds from step 732 to step 734.

In step 734 the UE performs uplink control information (UCI) transmissions as per parameters includes in Downlink Control Information (DCI). Step 734 includes step 736 in which the UE transmits ACK/NACKs corresponding to the HARQ IDs in the UCI request. Step 734 may, and sometimes does, include one or both of steps 738 and step 740. In step 738 the UE transmits a scheduling request (SR). In step 740 the UE transmits a CSI report. Operation proceeds from step 734 to step 744.

In step 744 the base station monitors for and/or receives UCI transmissions based on information included in the UCI request. Thus in step 744 the base station monitors for and/or receives uplink control information including HARQ information from the UE. Operation proceeds from step 744, via connecting node B 746, to the input of step 712.

Another exemplary embodiment is an extension of an embodiment corresponding to FIG. 4, in which the embodiment of FIG. 4 is extended to cover wideband operation on a carrier wider than 20 MHz. Another exemplary embodiment is an extension of an embodiment corresponding to FIG. 7, in which the embodiment of FIG. 7 is extended to cover wideband operation on a carrier wider than 20 MHz.

In one non-limiting example, the DL indication form the base station, e.g. gNB may, and sometimes does, also indicate one or more sub-bands on which the UE may attempt UL LBT, in addition to the UCI multiplexing information discussed previously.

In another example, example, the UE autonomously chooses whether to multiples the delayed HARQ ACk/NACK feedback with other UCI depending upon the number of LBT sub-bands it has passed UL LBT on, which dictates the quantum of frequency-domain resources it has available for transmission. In a further aspect, of some embodiments, the UE may, and sometimes does, multiples additional control information related to the quality or channel occupancy of individual sub-bands constituting the wideband carrier.

Figure 8:
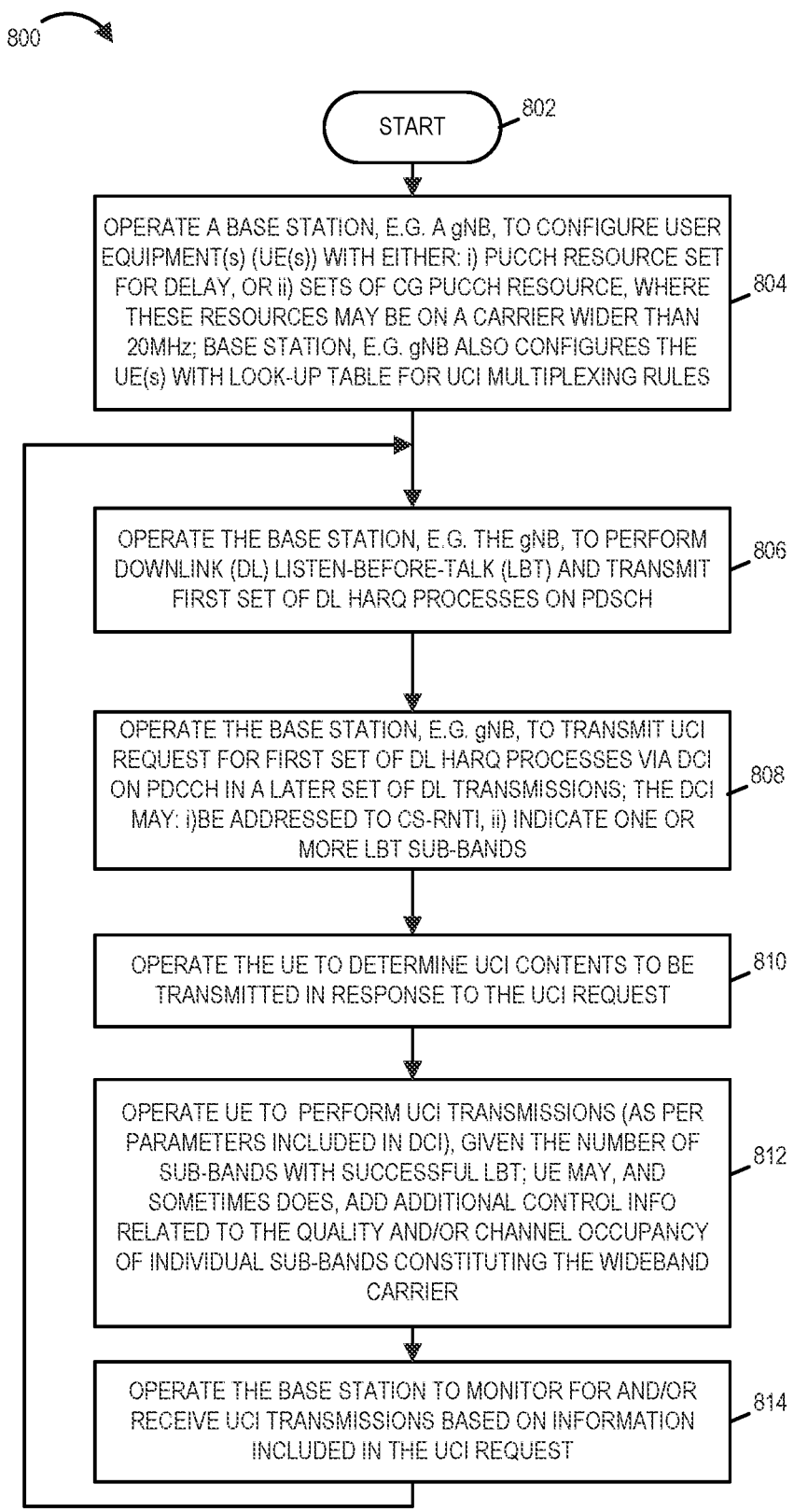
FIG. 8 is a flowchart of an exemplary communications method in accordance with an exemplary embodiment.

FIG. 8 is a flowchart 800 of an exemplary communications method in accordance with an exemplary embodiment. Flowchart 800 depicts base station, e.g. gNB, -user equipment (UE) interactions, e.g., base station 104-UE 110 interactions, in accordance with an exemplary embodiment. Operation of the exemplary method starts in step 802 in which the communications system, e.g. communications system 100 of FIG. 1, is powered on and initialized. Operation proceeds from step 802 to step 804.

In step 804, the base station, e.g. gNB, configures user equipments (UEs) with either: i) PUCCH resource set for delayed or ii) sets of GC PUSCH resource, where these resources may be on a carrier wider than 20 MHz; base station, e.g. gNB, also configured the UE(s) with look-up table for Uplink Control Information (UCI) multiplexing rules. Operation proceeds from step 804 to step 806.

In step 806 the base station, e.g. gNB, performs downlink (DL) listen-before-talk (LBT) and transmits a first set of DL HARQ processes on Physical Downlink Shared Channel (PDSCH). Operation proceeds from step 806 to step 808.

In step 808 the base station, e.g. gNB, transmits uplink control information (UCI) request for the first set of DL HARQ processes via Downlink Control Information (DCI) on Physical Downlink Control Channel (PDCCH) in a later set of downlink transmissions, wherein the DCI may: i) be addressed to Configured Scheduling-Radio Network Temporary Identifier (CS-RNTI)); ii) indicate one or more LBT sub-bands. Operation proceeds from step 808 to step 810.

In step 810 the UE determines uplink control information (UCI) contents to be transmitted in response to the UCI request. In step 810, the UE device determines control information related to channel quality or channel occupancy to multiplex and transmit with HARQ acknowledgement information in response to the UCI Request. Operation proceeds from step 810 to step 812.

In step 812 the UE performs uplink control information (UCI) transmissions as per parameters included in Downlink Control Information (DCI) given the number of sub-bands with successful LBT; UE may, and sometimes does, add additional control information related to the quality and/or channel occupancy of individual sub-bands constituting the wideband carrier. In step 812 the UE may, and sometimes does, transmit said determined control information related to channel quality or channel occupancy multiplexed with the determined HARQ acknowledgement information. Operation proceeds from step 812 to step 814.

In step 814 the base station monitors for and/or receives UCI transmissions based on information included in the UCI request. Thus in step 714 the base station monitors for and/or receives uplink control information including HARQ information from the UE. Operation proceeds from step 814 to the input of step 806.

Figure 9:
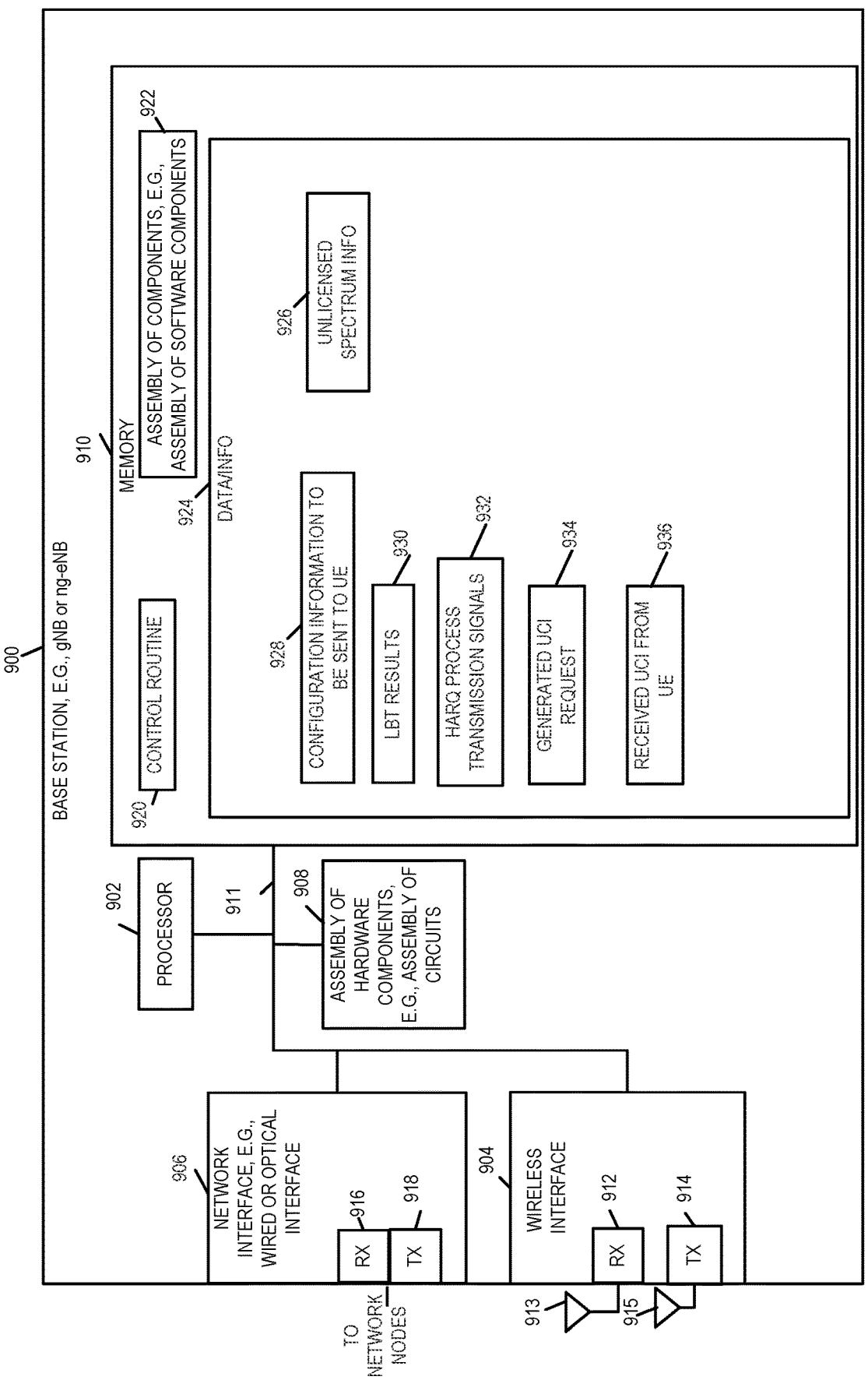
FIG. 9 is a drawing of an exemplary base station, e.g., a gNB or ng-eNB, in accordance with an exemplary embodiment.

FIG. 9 is a drawing of an exemplary base station 900, e.g., a gNB or ng-eNB, in accordance with an exemplary embodiment. In some embodiments, exemplary base station 900 of FIG. 9 implements: steps of the exemplary method of flowchart 400 of FIG. 4, steps of the exemplary method of flowchart 700 of FIG. 7, and/or steps of the exemplary method of flowchart 800 of FIG. 8. Base station 900 is, e.g., any of base stations (base station 1 104, base station 2 106, . . . , base station n 108) of FIG. 1.

Base station 900 includes a processor 902, e.g. a CPU, wireless interface 904, a network interface 906, e.g., a wired or optical interface, an assembly of hardware components 908, e.g., an assembly of circuits, and memory 910 coupled together via a bus 911 over which the various elements may interchange data and information.

Network interface 906 includes a receiver 916 and a transmitter 918. Network interface 906 to coupled to network nodes, e.g., via a backhaul network and/or the Internet. Wireless interface 904 includes a wireless receiver 912 and a wireless transmitter 914. The base station 900 receives signals from network devices, e.g. core network devices. Wireless receiver 912 is coupled to a receive antenna 913 via which the base station 900 can receive wireless signals, e.g., wireless signals from UE devices. Wireless transmitter 914 is coupled to a transmit antenna 915 via which the base station 900 can transmit wireless signals to UE devices.

Memory 910 includes a control routine 920, e.g., for controlling basic functions of the base station, an assembly of components 922, e.g., an assembly of software components, and data/information 924. Data/information 924 includes unlicensed spectrum information 926, configuration information to be sent to the UE 928, e.g., PUCCH resource sets, sets of CG PUCCH resource sets, and look-up tables for UCI multiplexing rules, LBT results 930, HARQ process transmission signals 932, e.g., generated UCI request 934, e.g., including DCI fields as shown in FIG. 3 and/or FIG. 6, and received UCI from UE 936.

Figure 10:
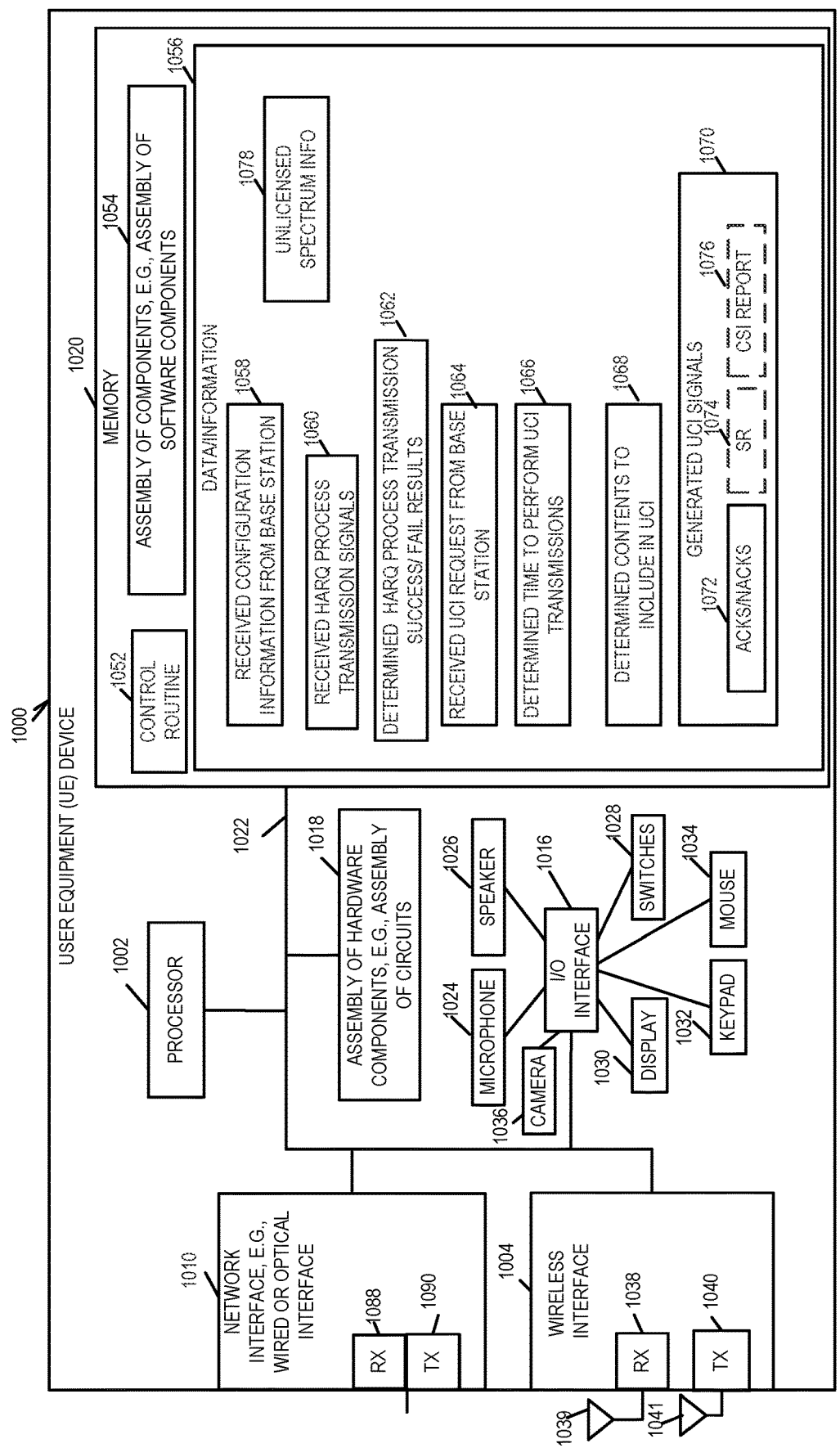
FIG. 10 is a drawing of an exemplary user equipment (UE) device implemented in accordance with an exemplary embodiment.

FIG. 10 is a drawing of an exemplary user equipment (UE) device 1000 implemented in accordance with an exemplary embodiment. UE device 1000 is, e.g. one of the UE devices (110, 112, 114, 116, 118, 120, 122) of system 100 of FIG. 1. UE device 1000 includes a processor 1002, a wireless interface 1004, a network interface 1010, an I/O interface 1016, an assembly of hardware components 1018, e.g., an assembly of circuits, and memory 1020 coupled together via a bus 1022 over which the various elements may interchange data and information. Wireless interface 1004 includes a wireless receiver 1038 coupled to receive antenna 1039, via which the UE may receive wireless signals, e.g., wireless downlink signals from a base station, e.g., a gNB. Wireless interface 1004 includes a wireless transmitter 1040 coupled to transmit antenna 1041, via which the UE may transmit wireless signals, e.g., wireless uplink signals to a base station, e.g., a gNB. Network interface 1010, e.g., a wired or optical interface 1010 includes a receiver 1088 and a transmitter 1090.

UE device 1000 further includes a microphone 1024, a speaker 1026, switches 1028, a mouse 1034, a keypad 1032, a display 1030 and a camera 1036 coupled to I/O interface 1016, via which the various input/output devices (1024, 1026, 1028, 1030, 1032, 1034, 1036) may communicate with the other elements (1002, 1004, 1010, 1018, 1020) of the UE device. Memory 1020 includes a control routine 1052, an assembly of components 1054, e.g., an assembly of software components, and data/information 1056.

Data/information 1056 includes received configuration information from base station 1058, received HARQ process transmission signals 1060, determined HARQ process transmission success/fail results 1062, received UCE request from base station 1064, determined time to perform UCE transmissions 1066, determined contents to include in UCE 1068, generated UCI signals 1070 and unlicensed spectrum information 1070. Generated UCI signals 1070 include ACK/NACKs 1072. Generated UCI signals 1070 may include SR 1074 and/or CSI report 1076, e.g., multiplexed with the HARQ ACK/NACKS in the UCI.

Figure 11A:
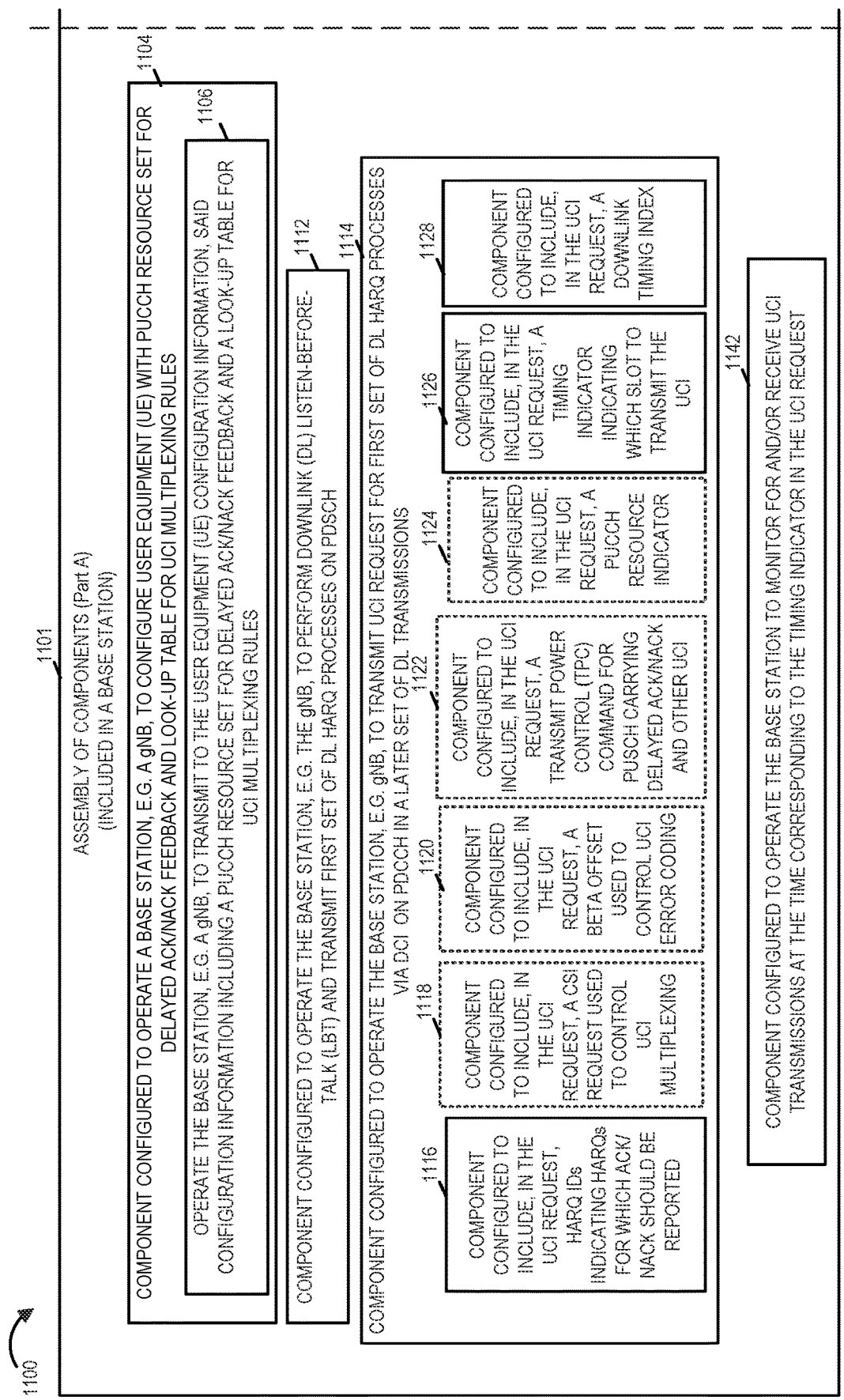
FIG. 11A is a drawing of a first part of an exemplary assembly of components, which may be included in an exemplary base station in accordance with an exemplary embodiment.
Figure 11B:
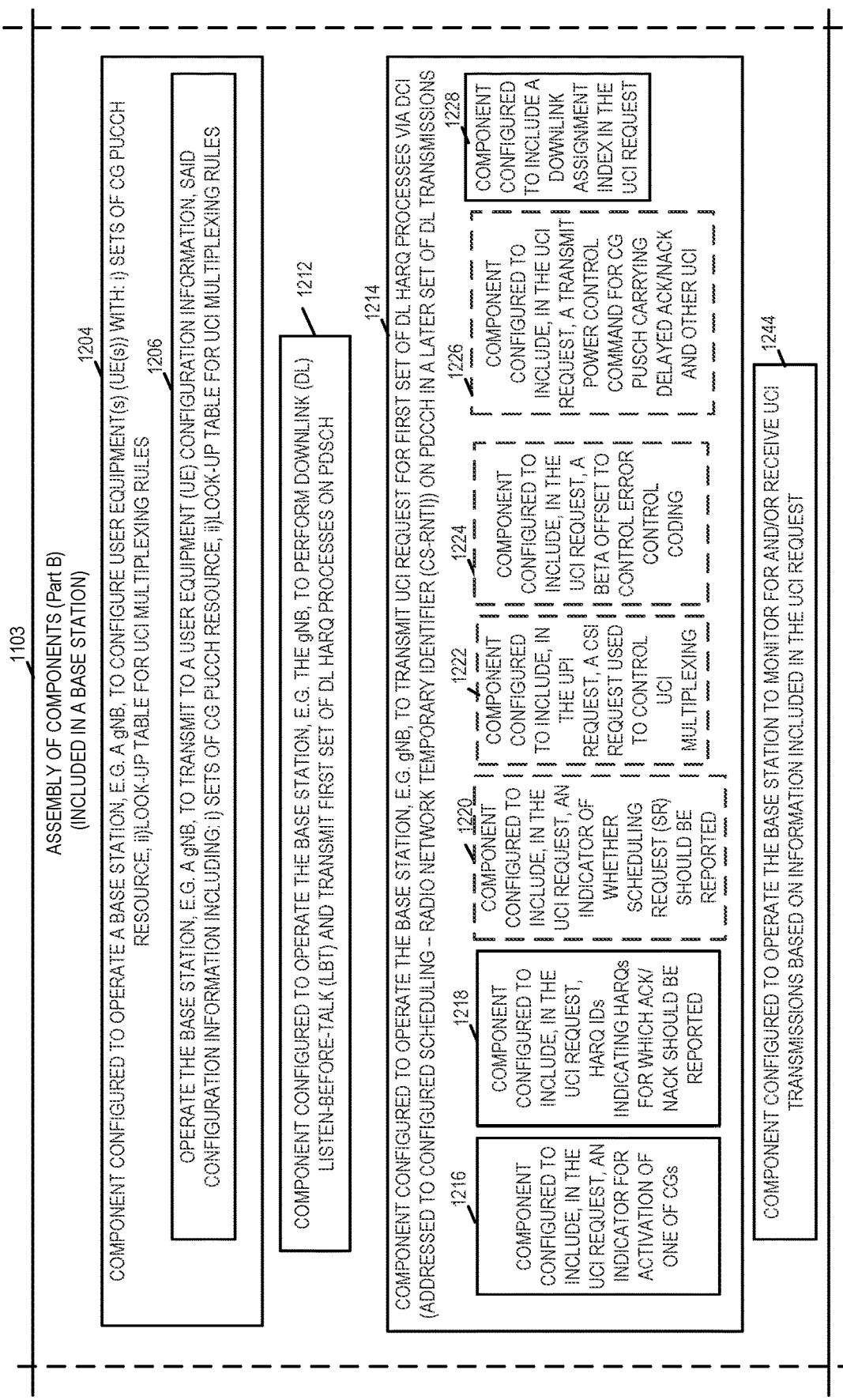
FIG. 11B is a drawing of a second part of an exemplary assembly of components, which may be included in an exemplary base station in accordance with an exemplary embodiment.

FIG. 11, comprising the combination of FIG. 11A, FIG. 11B and FIG. 11C, is a drawing of an exemplary assembly of components 1100, comprising Part A 1101, Part B 1103 and Part C 1105, in accordance with an exemplary embodiment. Exemplary assembly of components 1100 which may be included in a base station, e.g., a gNB or an ng-eNB, such as the exemplary base station 900, e.g., a gNB or ng-eNB, of FIG. 9, and implement steps of an exemplary method, e.g., steps of the method of the flowchart 400 of FIG. 4, steps of the method of the flowchart 700 of FIG. 7, and/or steps of the method of the flowchart 800 of FIG. 8.

Assembly of components 1100 can be, and in some embodiments is, used in base station 900, e.g., a gNB or ng-eNB, of FIG. 9, base station 1 104 of FIG. 1, base station 2 106 of FIG. 1 and/or base station n 108 of FIG. 1. The components in the assembly of components 1100 can, and in some embodiments are, implemented fully in hardware within the processor 902, e.g., as individual circuits. The components in the assembly of components 1100 can, and in some embodiments are, implemented fully in hardware within the assembly of components 908, e.g., as individual circuits corresponding to the different components. In other embodiments some of the components are implemented, e.g., as circuits, within the processor 902 with other components being implemented, e.g., as circuits within assembly of components 908, external to and coupled to the processor 902. As should be appreciated the level of integration of components on the processor and/or with some components being external to the processor may be one of design choice. Alternatively, rather than being implemented as circuits, all or some of the components may be implemented in software and stored in the memory 910 of the base station 900, e.g., a gNB or ng-eNB, with the components controlling operation of the base station to implement the functions corresponding to the components when the components are executed by a processor, e.g., processor 902. In some such embodiments, the assembly of components 1100 is included in the memory 910 as assembly of components 922. In still other embodiments, various components in assembly of components 1100 are implemented as a combination of hardware and software, e.g., with another circuit external to the processor 902 providing input to the processor 902 which then under software control operates to perform a portion of a component's function. While processor 902 is shown in the FIG. 9 embodiment as a single processor, e.g., computer, it should be appreciated that the processor 902 may be implemented as one or more processors, e.g., computers.

When implemented in software the components include code, which when executed by the processor 902, configure the processor 902 to implement the function corresponding to the component. In embodiments where the assembly of components 900 is stored in the memory 910, the memory 910 is a computer program product comprising a computer readable medium comprising code, e.g., individual code for each component, for causing at least one computer, e.g., processor 902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the base station 900, or elements therein such as the processor 902, to perform the functions of corresponding steps illustrated and/or described in the method of one or more of the flowcharts, signaling diagrams and/or described with respect to any of the Figures. Thus the assembly of components 1100 includes various components that perform functions of corresponding one or more described and/or illustrated steps of an exemplary method, e.g., steps of: the method of flowchart 400 of FIG. 4, the method of flowchart 700 of FIG. 7, and/or the method the method of flowchart 800 of FIG. 8 and/or described or shown with respect to any of the other figures.

Assembly of components 1100 includes a component 1104 configured to operate a base station, e.g., a gNB to configure a user equipment (UE) with PUCCH resource set for delayed ACK/NACK feedback and look-up table for UCI multiplexing rules. Component 1104 includes a component 1106 configured to operate the base station, e.g., gNB, to transmit to the UE configuration information, said configuration information including a PUCCH resource set for delayed ACK/NACK feedback and a look-up table for UCI multiplexing rules. Assembly of components 1100 further includes a component 1112 configured to operate the base station, e.g., gNB to perform downlink (DL) listen-before-talk (LBT) and transmit a first set of DL HARQ processes on PDSCH. Assembly of components 1100 further includes a component 1114 configured to operate the base station, e.g. gNB to transmit UCI request for first set of DL HARQ processes via DCI on PDCCH in a later set of DL transmissions. Component 1114 includes a component 1116 configured to include in the UCI request HARQ IDs indicating HARQs for which ACK/NACK should be reported, a component 1118 configured to include in the UCI request a CSI request used to control UCI multiplexing, a component 1120 configured to include in the UCI request a beta offset used to control UCI error coding, a component 1124 configured to included in the UCI request a transmit power control (TPC) command for PUSCH carrying delayed ACK/NACK and other UCI, a component 1124 configured to include in the UCI request a timing indicator indicating which slot to transmit the UCI, and a component 1128 configured to include in the UCI request a downlink timing index. Assembly of components 1100 further includes a component 1142 configured to operate the base station to monitor for and/or receive UCI transmission at the time corresponding to the timing indicator in the UCI request. Component 1142 is configured to operate the base station to monitor for and/or receive uplink control information including HARQ information from the UE.

Assembly of components 1100 further includes a component 1204 configured to operate a base station, e.g., a gNB to configure user equipments (UEs) with: i) set of CG PUCCH resource and ii) look-up table for UCI multiplexing rules. Component 1204 includes a component 1206 configured to operate the base station, e.g., gNB, to transmit to the UE configuration information, said configuration information including: i) sets of CG aPUCCH resource; and ii) look-up table for UCI multiplexing rules. Assembly of components 1100 further includes a component 1212 configured to operate the base station, e.g., gNB to perform downlink (DL) listen-before-talk (LBT) and transmit a first set of DL HARQ processes on PDSCH. Assembly of components 1100 further includes a component 1214 configured to operate the base station, e.g. gNB to transmit UCI request for first set of DL HARQ processes via DCI, addressed to configured scheduling-radio network temporary identifier (CS-RNTI) on PDCCH in a later set of DL transmissions. Component 1214 includes a component 1216 configured to include, in the UCI request, an indicator for activation of one of the configured grants (CGs), a component 1218 configured to include in the UCI request HARQ IDs indicating HARQs for which ACK/NACK should be reported, a component 1220 configured to include, in the UCI request, an indicator of whether scheduling request (SR) should be reported, a component 1222 configured to include in the UCI request a CSI request used to control UCI multiplexing, a component 1224 configured to include in the UCI request a beta offset used to control UCI error control coding, a component 1126 configured to included in the UCI request a transmit power control (TPC) command for CG PUSCH carrying delayed ACK/NACK and other UCI, and a component 1228 configured to include in the UCI request a downlink assignment index. Assembly of components 1100 further includes a component 1244 configured to operate the base station to monitor for and/or receive UCI transmission based on the information included in the UCI request. Component 1244 is configured to operate the base station to monitor for and/or receive uplink control information including HARQ information from the UE.

Assembly of components 1100 further includes a component 1304 configured to operate a base station, e.g., a gNB, to configure user equipment(s) (UE(s)) with either: i) PUCCH resource set for delay, or ii) sets of CG PUCCH resource, where the resources may be on a carrier wider than 20 MHz. Component 1304 is also configured to configured the UE(s) with look-up table for UCI multiplexing rules. Assembly of components 1100 further includes a component 1306 configured to operate the base station, e.g., gNB to perform listen-before-talk (LBT) and transmit first set of DL HARQ processes on PDSCH, a component 1308 configured to operate the base station, e.g. gNB, to transmit UCI request for first set of DL HARQ processes via DCI on PDCCH in a later set of DL transmission. Component 1308 is configured to, in some embodiments, address the DCI in CS-RNTI and ii) indicate one of more LBT sub-bands, and a component 1314 configured to operate the base station to monitor for and/or receive UCI transmissions based on information included in the UCI request. Component 1314 is configured to operate the base station to monitor for and/or receive uplink control information including HARQ information from the UE.

Figure 12A:
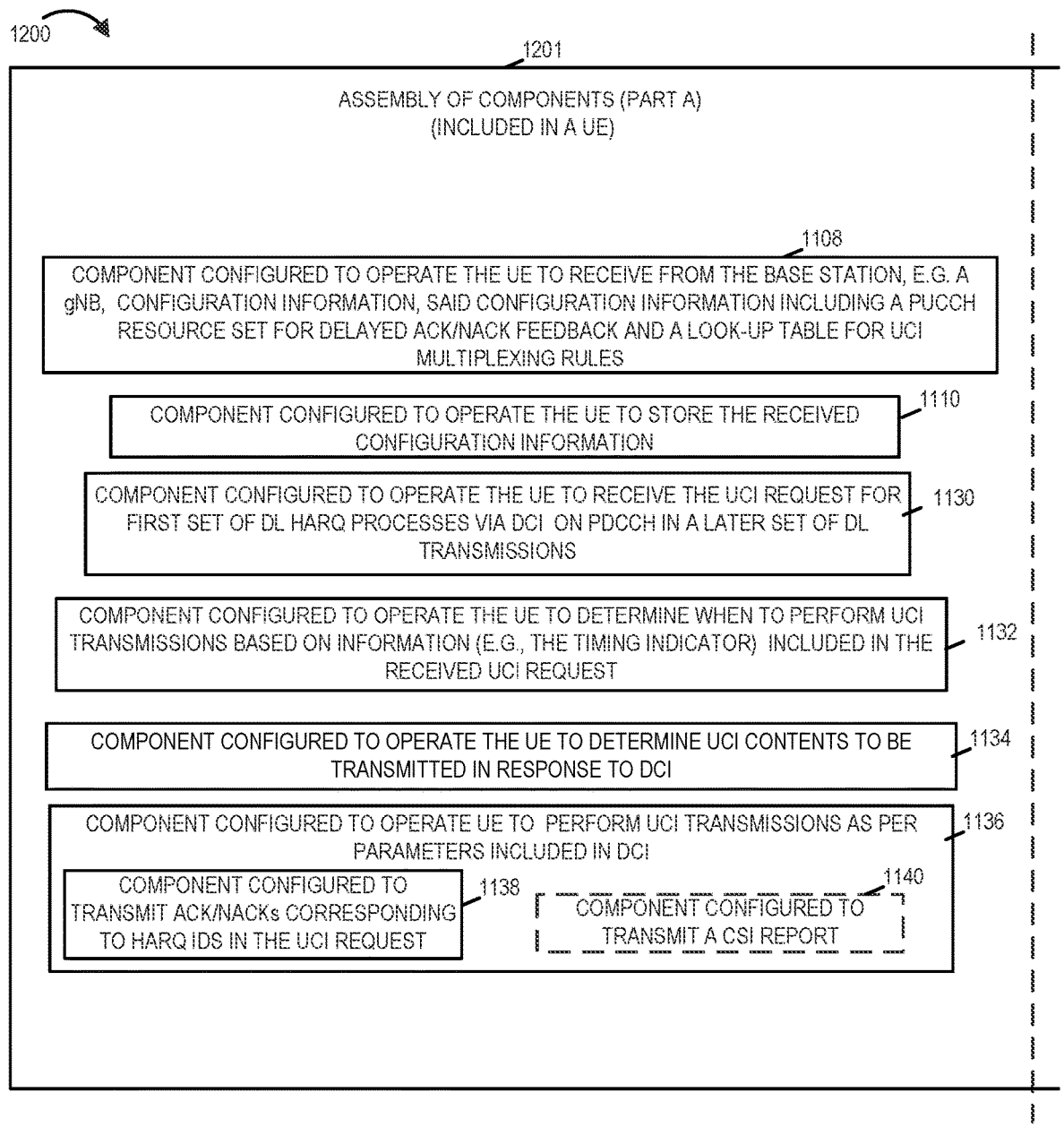
FIG. 12A is a drawing of a first part of an exemplary assembly of components, which may be included in an exemplary user equipment (UE), in accordance with an exemplary embodiment.

FIG. 12, comprising the combination of FIG. 12 and FIG. 12B, is a drawing of an exemplary assembly of components 1200, comprising Part A 1201 and Part B 1203, in accordance with an exemplary embodiment. Exemplary assembly of components 1200 which may be included in a user equipment (UE) device, e.g., UE device 1000 of FIG. 10, and implement steps of an exemplary method, e.g., steps of the method of the flowchart 400 of FIG. 4, steps of the method of the flowchart 700 of FIG. 7, and/or steps of the method of the flowchart 800 of FIG. 8.

Assembly of components 1200 can be, and in some embodiments is, used in UE device 1000 of FIG. 10, or any of the UEs of FIG. 1, e.g. UE 110 of FIG. 1. The components in the assembly of components 1200 can, and in some embodiments are, implemented fully in hardware within the processor 1002, e.g., as individual circuits. The components in the assembly of components 1200 can, and in some embodiments are, implemented fully in hardware within the assembly of components 1018, e.g., as individual circuits corresponding to the different components. In other embodiments some of the components are implemented, e.g., as circuits, within the processor 1002 with other components being implemented, e.g., as circuits within assembly of components 1018, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1020 of the UE device 1000, with the components controlling operation of the UE device to implement the functions corresponding to the components when the components are executed by a processor, e.g., processor 1002. In some such embodiments, the assembly of components 1200 is included in the memory 1020 as assembly of components 1054. In still other embodiments, various components in assembly of components 1200 are implemented as a combination of hardware and software, e.g., with another circuit external to the processor 1002 providing input to the processor 1002 which then under software control operates to perform a portion of a component's function. While processor 1002 is shown in the FIG. 10 embodiment as a single processor, e.g., computer, it should be appreciated that the processor 1002 may be implemented as one or more processors, e.g., computers.

When implemented in software the components include code, which when executed by the processor 1002, configure the processor 1002 to implement the function corresponding to the component. In embodiments where the assembly of components 1200 is stored in the memory 1020, the memory 1020 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the UE 1000, or elements therein such as the processor 1002, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method, e.g., steps of: the method of flowchart 400 of FIG. 4, the method of flowchart 700 of FIG. 7, and/or the method the method of flowchart 800 of FIG. 8 and/or described or shown with respect to any of the other figures.

Assembly of components 1200 includes a component 1108 configured to operate the UE to receive from the base station, e.g., a gNB configuration information, said configuration information including a PUCCH resource set for delayed ACK/NACK feedback and a look-up table for UCI multiplexing rules, a component 1110 configured to operate the UE to stored the received configuration information, a component 1130 configured to operate the UE to receive the UCI request for first set of downlink (DL) HARQ processes via DCI on PDCCH in a later set of downlink transmissions, a component 1132 configured to operate the UE to determine when to perform UCI transmission based on information, e.g. the timing indicator, included in the received UCI request, a component 1136 configured to operate the UE to perform UCI transmission as per parameters including in DCI. Component 1136 includes a component 1138 configured to operate the UE to transmit ACK/NACKs corresponding to the HARQ IDs in the UCI request and a component 1140 configured to operate the UE to transmit a CSI report.

Assembly of components 1200 includes a component 1208 configured to operate the UE to receive from the base station, e.g., a gNB, configuration information, said configuration information including sets of CG PUCCH resource and ii) a look-up table for UCI multiplexing rules, a component 1210 configured to operate the UE to stored the received configuration information, a component 1230 configured to operate the UE to receive the UCI request for first set of downlink (DL) HARQ processes via DCI, addresses to CS-RNTI, on PDCCH in a later set of downlink transmissions, a component 1231 configured to operate the UE to determine when to perform UCI transmission based on information, e.g. the indicator indicating the one of the CGs, which corresponds to a configured set of CG OUSCH resources, included in the received UCI request, a component 1232 configured to operate the UE to determine UCI contents to be transmitted in response to DCI, a component 1234 configured to operate the UE to perform UCI transmission as per parameters including in DCI. Component 1234 includes a component 1236 configured to operate the UE to transmit ACK/NACKs corresponding to the HARQ IDs in the UCI request, a component 11238 configured to operate the UE to transmit a scheduling request (SR), and a component 1240 configured to operate the UE to transmit a CSI report.

Assembly of components 1200 further includes a component 1310 configured to operate the UE to determine UCI contents to be transmitted in response to the UCI request, e.g., the UE device determines control information related to channel quality or channel occupancy to multiplex and transmit with HARQ acknowledgement information in response to the UCI Request, and a component 1312 configured to operate the UE to perform UCI transmission, as per parameters including in the DCI, given the number of sub-bands with successful LBT. Component 1312 is further configured to add additional control information related to the quality and/or channel occupancy of individual sub-bands constituting wideband carrier. Component 1312 is further configured operate the UE to transmit said added additional control information related to the quality and/or channel occupancy of individual sub-bands constituting wideband carrier. Component 1312 is configured to operating the UE to transmit, e.g., via a wireless transmitter, said determined control information related to channel quality or channel occupancy multiplexed with the determined HARQ acknowledgement information

NUMBERED LIST OF EXEMPLARY METHOD EMBODIMENTS

Method Embodiment 1 A communications method, the method comprising: operating (414 or 714 or 808) a base station (gNB) to transmit an uplink control information (UCI) request (300 or 600) in a Physical Downlink Control Channel (PDCCH) to a User Equipment (UE), said UCI request requesting transmission of HARQ acknowledgment information for one or more previously communicated transmission segments identified by HARQ IDs included in the UCI request and including an indication of information to be multiplexed with HARQ acknowledgement information; and operating (442 or 744) the base station to monitor for uplink control information including HARQ information from the UE.

Method Embodiment 2 The communications method of Method Embodiment 1, wherein said HARQ information includes an acknowledgment (ACK) or negative acknowledgment (NACK) corresponding to each of the identified HARQ IDs included in the UCI request.

Method Embodiment 3 The communications method of Method Embodiment 2, wherein said uplink control information request (300) is via downlink control information (DCI) in the Physical Downlink Control Channel (PDCCH).

Method Embodiment 4 The communications method of Method Embodiment 3, wherein said UCI request (300) is requesting the UE to transmit said HARQ acknowledgment information in a Physical Uplink Control Channel (PUCCH) or Physical Uplink Shared Channel (PUSCH).

Method Embodiment 5 The communications method of Method Embodiment 4, further comprising: operating (412) the base station to transmit a set of HARQ processes, corresponding to said HARQ IDs, in a first channel occupancy time (COT) (e.g., COT n); and operating (442) the base station to receive said uplink control information including HARQ information during a second COT (e.g., COT n+1), said second COT being after said first COT.

Method Embodiment 6 The communications method of Method Embodiment 5, wherein said transmitted UCI request and said uplink control information including HARQ acknowledgment information are transmitted in unlicensed spectrum.

Method Embodiment 7 The communications method of Method Embodiment 1, wherein the HARQ IDs (302 or 618) included in the UCI request (300 or 600) occupy up to 16 bits of the UCI request.

Method Embodiment 8 The communications method of Method Embodiment 1, wherein said UCI request (300) further includes a timing indicator (312) indicating which slot of an uplink channel in which the requested UCI information is to be transmitted.

Method Embodiment 9 The communications method of Method Embodiment 8, wherein said indication of information to be multiplexed with HARQ acknowledgment information is a Channel State Information (CSI) request (304) indicating what information is to be multiplexed with HARQ acknowledgment information to be communicated in response to the CSI request.

Method Embodiment 10 The communications method of Method Embodiment 9, wherein said CSI request (304) is an indicator including 6 or fewer bits indicating the format and content of the information to be multiplexed with the HARQ acknowledgment information to be communicated in a CSI report in response to the CSI request.

Method Embodiment 11 The communications method of Method Embodiment 8, further comprising, prior to operating (414) a base station (gNB) to transmit said uplink control information (UCI) request, operating (404) the base station to configure the UE with: i) Physical Uplink Control Channel (PUCCH) Resource Set for delayed acknowledgment/negative acknowledgement (ACK/NACK) feedback; and ii) a look-up table for UCI multiplexing rules.

Method Embodiment 12 The communications method of Method Embodiment 2, wherein said uplink control information request (600) is via downlink control information (DCI) addressed to a Configured Scheduling-Radio Network Temporary Identifier (CS-RNTI) in the Physical Downlink Control Channel (PDCCH).

Method Embodiment 13 The communications method of Method Embodiment 12, wherein said UCI request (600) is requesting the UE to transmit said HARQ acknowledgment information in a Configured Grant Physical Uplink Control Channel (CG PUCCH) or a Configured Grant Physical Uplink Shared Channel (CG PUSCH).

Method Embodiment 14 The communications method of Method Embodiment 13, further comprising: operating (712) the base station to transmit a set of HARQ processes, corresponding to said HARQ IDs, in a first channel occupancy time (COT)(e.g. COT n); and operating (742) the base station to receive said uplink control information including HARQ information during a second COT (e.g., COT n+2), said second COT being after said first COT.

Method Embodiment 15 The communications method of Method Embodiment 14, wherein said transmitted UCI request and said uplink control information including HARQ acknowledgment information are transmitted in unlicensed spectrum.

Method Embodiment 16 The communications method of Method Embodiment 1, wherein said UCI request (600) further includes indicators (602) for activation of one of a plurality of configured grants (e.g., 2 bits if four sets of CG PUSCHs are configured to a UE).

Method Embodiment 17 The communications method of Method Embodiment 16, wherein the HARQ IDs (604) included in the UCI request (600) occupy up to 16 bits of the UCI request (600).

Method Embodiment 18 The communications method of Method Embodiment 17, wherein said UCI request (600) further includes a indication (606) of whether scheduling request (SR) should be reported (e.g., 1 bit).

Method Embodiment 19 The communications method of Method Embodiment 17, wherein said indication of information to be multiplexed with HARQ acknowledgment information is a Channel State Information (CSI) request (608) indicating what information is to be multiplexed with HARQ acknowledgment information to be communicated in response to the CSI request.

Method Embodiment 20 The communications method of Method Embodiment 19, wherein said CSI request (608) is an indicator including 6 or fewer bits indicating the format and content of the information to be multiplexed with the HARQ acknowledgment information to be communicated in a CSI report in response to the CSI request.

Method Embodiment 21 The communications method of Method Embodiment 16, further comprising, prior to operating (714) a base station (gNB) to transmit said uplink control information (UCI) request, operating (704) the base station to configure the UE with: i) sets of Configured Grant Physical Uplink Control Channel (CG PUCCH) Resource for delayed acknowledgment/negative acknowledgement (ACK/NACK) feedback; and ii) a look-up table for UCI multiplexing rules.

Method Embodiment 22 The communications method of Method Embodiment 1, wherein the PUCCH is on a carrier wider than 20 MHz; and wherein the method further comprises: operating (806) the base station to perform downlink listen before talk; and wherein said UCI request requesting transmission of HARQ acknowledgment information indicates one or more LBT sub-bands to be used for communicating the requested information.

Method Embodiment 23 The communications method of Method Embodiment 22, further comprising: operating (810) the UE device to determine control information related to channel quality or channel occupancy to multiplex and transmit with HARQ acknowledgement information in response to the UCI Request.

Method Embodiment 24 The communications method of Method Embodiment 23, further comprising: operating the UE to transmit (812) said determined control information related to channel quality or channel occupancy multiplexed with the determined HARQ acknowledgement information.

NUMBERED LIST OF EXEMPLARY APPARATUS EMBODIMENTS

Apparatus Embodiment 1 A base station (e.g., gNB) (104 or 900) comprising: a wireless transmitter (914); a wireless receiver (912); and a processor (902) configured to: operate (414 or 714 or 808) the base station (gNB) to transmit (e.g., via the wireless transmitter) an uplink control information (UCI) request (300 or 600) in a Physical Downlink Control Channel (PDCCH) to a User Equipment (UE), said UCI request requesting transmission of HARQ acknowledgment information for one or more previously communicated transmission segments identified by HARQ IDs included in the UCI request and including an indication of information to be multiplexed with HARQ acknowledgement information; and operate (442 or 744 or 814) the base station to monitor for uplink control information including HARQ information from the UE.

Apparatus Embodiment 2 The base station of Apparatus Embodiment 1, wherein said HARQ information includes an acknowledgment (ACK) or negative acknowledgment (NACK) corresponding to each of the identified HARQ IDs included in the UCI request.

Apparatus Embodiment 3 The base station of Apparatus Embodiment 2, wherein said uplink control information request (300) is via downlink control information (DCI) in the Physical Downlink Control Channel (PDCCH).

Apparatus Embodiment 4 The base station of Apparatus Embodiment 3, wherein said UCI request (300) is requesting the UE to transmit said HARQ acknowledgment information in a Physical Uplink Control Channel (PUCCH) or Physical Uplink Shared Channel (PUSCH).

Apparatus Embodiment 5 The base station of Apparatus Embodiment 4, wherein said processor is further configured to: operate (412) the base station to transmit a set of HARQ processes, corresponding to said HARQ IDs, in a first channel occupancy time (COT) (e.g., COT n); and operate (442) the base station to receive said uplink control information including HARQ information during a second COT (e.g., COT n+1), said second COT being after said first COT.

Apparatus Embodiment 6 The base station of Apparatus Embodiment 5, wherein said transmitted UCI request and said UCI including HARQ acknowledgment information are transmitted in unlicensed spectrum.

Apparatus Embodiment 7 The base station of Apparatus Embodiment 1, wherein the HARQ IDs (302 or 618) included in the UCI request (300 or 600) occupy up to 16 bits of the UCI request.

Apparatus Embodiment 8 The base station of Apparatus Embodiment 1, wherein said UCI request (300) further includes a timing indicator (312) indicating which slot of an uplink channel in which the requested UCI information is to be transmitted.

Apparatus Embodiment 9 The base station of Apparatus Embodiment 8, wherein said indication of information to be multiplexed with HARQ acknowledgment information is a Channel State Information (CSI) request (304) indicating what information is to be multiplexed with HARQ acknowledgment information to be communicated in response to the CSI request.

Apparatus Embodiment 10 The base station of Apparatus Embodiment 9, wherein said CSI request (304) is an indicator including 6 or fewer bits indicating the format and content of the information to be multiplexed with the HARQ acknowledgment information to be communicated in a CSI report in response to the CSI request.

Apparatus Embodiment 11 The base station of Apparatus Embodiment 8, wherein said processor is further configured to: operate (404) the base station to configure the UE with: i) Physical Uplink Control Channel (PUCCH) Resource Set for delayed acknowledgment/negative acknowledgement (ACK/NACK) feedback; and ii) a look-up table for UCI multiplexing rules. Prior to operating (414) a base station (gNB) to transmit said uplink control information (UCI) request, wherein said operating (404) the base station to configure the UE being prior to said operating (414) the base station (gNB) to transmit said uplink control information (UCI) request.

Apparatus Embodiment 12 The base station of Apparatus Embodiment 2, wherein said uplink control information request (600) is via downlink control information (DCI) addressed to a Configured Scheduling-Radio Network Temporary Identifier (CS-RNTI) in the Physical Downlink Control Channel (PDCCH).

Apparatus Embodiment 13 The base station of Apparatus Embodiment 12, wherein said UCI request (600) is requesting the UE to transmit said HARQ acknowledgment information in a Configured Grant Physical Uplink Control Channel (CG PUCCH) or a Configured Grant Physical Uplink Shared Channel (CG PUSCH).

Apparatus Embodiment 14 The base station of Apparatus Embodiment 13, wherein said processor is further configured to: operate (712) the base station to transmit a set of HARQ processes, corresponding to said HARQ IDs, in a first channel occupancy time (COT)(e.g. COT n); and operate (742) the base station to receive said uplink control information including HARQ information during a second COT (e.g., COT n+2), said second COT being after said first COT.

Apparatus Embodiment 15 The base station of Apparatus Embodiment 14, wherein said transmitted UCI request and said UCI including HARQ acknowledgment information are transmitted in unlicensed spectrum.

Apparatus Embodiment 16 The base station of Apparatus Embodiment 1, wherein said UCI request (600) further includes indicators (602) for activation of one of a plurality of configured grants (e.g., 2 bits if four sets of CG PUSCHs are configured to a UE).

Apparatus Embodiment 17 The base station of Apparatus Embodiment 16, wherein the HARQ IDs (604) included in the UCI request (600) occupy up to 16 bits of the UCI request (600).

Apparatus Embodiment 18 The base station of Apparatus Embodiment 17, wherein said UCI request (600) further includes a indication (606) of whether scheduling request (SR) should be reported (e.g., 1 bit).

Apparatus Embodiment 19 The base station of Apparatus Embodiment 17, wherein said indication of information to be multiplexed with HARQ acknowledgment information is a Channel State Information (CSI) request (608) indicating what information is to be multiplexed with HARQ acknowledgment information to be communicated in response to the CSI request.

Apparatus Embodiment 20 The base station of Apparatus Embodiment 19, wherein said CSI request (608) is an indicator including 6 or fewer bits indicating the format and content of the information to be multiplexed with the HARQ acknowledgment information to be communicated in a CSI report in response to the CSI request.

Apparatus Embodiment 21 The base station of Apparatus Embodiment 16, wherein said processor is further configured to: operate (704) the base station to configure the UE with: i) sets of Configured Grant Physical Uplink Control Channel (CG PUCCH) Resource for delayed acknowledgment/negative acknowledgement (ACK/NACK) feedback; and ii) a look-up table for UCI multiplexing rules, and wherein said operating (704) the base station to configure the UE prior being performed prior to said operating (714) a base station (gNB) to transmit said uplink control information (UCI) request.

Apparatus Embodiment 22 The base station of Apparatus Embodiment 1, wherein the PUCCH is on a carrier wider than 20 MHz; and wherein said processor is further configured to: operate (806) the base station to perform downlink listen before talk; and wherein said UCI request requesting transmission of HARQ acknowledgment information indicates one or more LBT sub-bands to be used for communicating the requested information.

NUMBERED LIST OF EXEMPLARY SYSTEM EMBODIMENTS

System Embodiment 1 A communications system (100) comprising: a base station (e.g., gNB) (104 or 900) including: a wireless transmitter (914); a wireless receiver (912); and a first processor (902) configured to: operate (414 or 714 or 808) the base station (gNB) to transmit (e.g., via the wireless transmitter) an uplink control information (UCI) request (300 or 600) in a Physical Downlink Control Channel (PDCCH) to a User Equipment (UE), said UCI request requesting transmission of HARQ acknowledgment information for one or more previously communicated transmission segments identified by HARQ IDs included in the UCI request and including an indication of information to be multiplexed with HARQ acknowledgement information; and operate (442 or 744 or 814) the base station to monitor for uplink control information including HARQ information from the UE.

System Embodiment 2 The communications system of System Embodiment 1, wherein said HARQ information includes an acknowledgment (ACK) or negative acknowledgment (NACK) corresponding to each of the identified HARQ IDs included in the UCI request.

System Embodiment 3 The communications system of System Embodiment 2, wherein said uplink control information request (300) is via downlink control information (DCI) in the Physical Downlink Control Channel (PDCCH).

System Embodiment 4 The communications system of System Embodiment 3, wherein said UCI request (300) is requesting the UE to transmit said HARQ acknowledgment information in a Physical Uplink Control Channel (PUCCH) or a Physical Uplink Shared Channel (PUSCH).

System Embodiment 5 The communications system of System Embodiment 4, wherein said first processor is further configured to: operate (412) the base station to transmit a set of HARQ processes, corresponding to said HARQ IDs, in a first channel occupancy time (COT) (e.g., COT n); and operate (442) the base station to receive said uplink control information including HARQ information during a second COT (e.g. COT n+1), said second COT being after said first COT.

System Embodiment 6 The communications system of System Embodiment 5, wherein said transmitted UCI request and said UCI including HARQ acknowledgment information are transmitted in unlicensed spectrum.

System Embodiment 7 The communications system of System Embodiment 1, wherein the HARQ IDs (302 or 618) included in the UCI request (300 or 600) occupy up to 16 bits of the UCI request.

System Embodiment 8 The communications system of System Embodiment 1, wherein said UCI request (300) further includes a timing indicator (312) indicating which slot of an uplink channel in which the requested UCI information is to be transmitted.

System Embodiment 9 The communications system of System Embodiment 8, wherein said indication of information to be multiplexed with HARQ acknowledgment information is a Channel State Information (CSI) request (304) indicating what information is to be multiplexed with HARQ acknowledgment information to be communicated in response to the CSI request.

System Embodiment 10 The communications system of System Embodiment 9, wherein said CSI request (304) is an indicator including 6 or fewer bits indicating the format and content of the information to be multiplexed with the HARQ acknowledgment information to be communicated in a CSI report in response to the CSI request.

System Embodiment 11 The communications system of System Embodiment 8, wherein said first processor is further configured to: operate (404) the base station to configure the UE with: i) Physical Uplink Control Channel (PUCCH) Resource Set for delayed acknowledgment/negative acknowledgement (ACK/NACK) feedback; and ii) a look-up table for UCI multiplexing rules, wherein said operating (404) the base station to configure the UE being prior to said operating (414) the base station (gNB) to transmit said uplink control information (UCI) request.

System Embodiment 12 The communications system of System Embodiment 2, wherein said uplink control information request (600) is via downlink control information (DCI) addressed to a Configured Scheduling-Radio Network Temporary Identifier (CS-RNTI) in the Physical Downlink Control Channel (PDCCH).

System Embodiment 13 The communications system of System Embodiment 12, wherein said UCI request (600) is requesting the UE to transmit said HARQ acknowledgment information in a Configured Grant Physical Uplink Control Channel (CG PUCCH) or a Configured Grant Physical Uplink Shared Channel (CG PUSCH).

System Embodiment 14 The communications system of System Embodiment 13, wherein said first processor is further configured to: operate (712) the base station to transmit a set of HARQ processes, corresponding to said HARQ IDs, in a first channel occupancy time (COT) (e.g., COT n); and operate (742) the base station to receive said uplink control information including HARQ information during a second COT (e.g., COT n+2), said second COT being after said first COT.

System Embodiment 15 The communications system of System Embodiment 14, wherein said transmitted UCI request and said UCI including HARQ acknowledgment information are transmitted in unlicensed spectrum.

System Embodiment 16 The communications system of System Embodiment 1, wherein said UCI request (600)

further includes indicators (602) for activation of one of a plurality of configured grants (e.g., 2 bits if four sets of CG PUSCHs are configured to a UE).

System Embodiment 17 The communications system of System Embodiment 16, wherein the HARQ IDs (604) included in the UCI request (600) occupy up to 16 bits of the UCI request (600).

System Embodiment 18 The communications system of System Embodiment 17, wherein said UCI request (600) further includes a indication (606) of whether scheduling request (SR) should be reported (e.g., 1 bit).

System Embodiment 19 The communications system of System Embodiment 17, wherein said indication of information to be multiplexed with HARQ acknowledgment information is a Channel State Information (CSI) request (608) indicating what information is to be multiplexed with HARQ acknowledgment information to be communicated in response to the CSI request.

System Embodiment 20 The communications system of System Embodiment 19, wherein said CSI request (608) is an indicator including 6 or fewer bits indicating the format and content of the information to be multiplexed with the HARQ acknowledgment information to be communicated in a CSI report in response to the CSI request.

System Embodiment 21 The communications system of System Embodiment 16, wherein said first processor is further configured to: operate (704) the base station to configure the UE with: i) sets of Configured Grant Physical Uplink Control Channel (CG PUCCH) Resource for delayed acknowledgment/negative acknowledgement (ACK/NACK) feedback; and ii) a look-up table for UCI multiplexing rules, and wherein said operating (704) the base station to configure the UE prior being performed prior to said operating (714) a base station (gNB) to transmit said uplink control information (UCI) request.

System Embodiment 22 The communications system of System Embodiment 1, wherein the PUCCH is on a carrier wider than 20 MHz; and wherein said processor is further configured to: operate (806) the base station to perform downlink listen before talk; and wherein said UCI request requesting transmission of HARQ acknowledgment information indicates one or more LBT sub-bands to be used for communicating the requested information.

System Embodiment 23 The communications system of System Embodiment 22, further comprising: said UE (110 or 1000), said UE including a second processor (1002) configured to: operate (810) the UE device to determine control information related to channel quality or channel occupancy to multiplex and transmit with HARQ acknowledgement information in response to the UCI Request.

System Embodiment 24 The communications system of System Embodiment 23, wherein said second processor (1002) is further configured to: operate the UE to transmit (812), e.g., via wireless transmitter (1040) said determined control information related to channel quality or channel occupancy multiplexed with the determined HARQ acknowledgement information.

NUMBERED LIST OF EXEMPLARY NON-TRANSITORY COMPUTER READABLE MEDIUM EMBODIMENTS

Non-Transitory Computer Readable medium Embodiment 1 A non-transitory computer readable medium (910) including computer executable instructions which when executed by a processor (902) control a base station (900) (e.g., gNB) (e.g., using unlicensed spectrum) to perform the steps of: operating (414 or 714 or 808) the base station (gNB) to transmit an uplink control information (UCI) request (300 or 600) in a Physical Downlink Control Channel (PDCCH) to a User Equipment (UE), said UCI request requesting transmission of HARQ acknowledgment information for one or more previously communicated transmission segments identified by HARQ IDs included in the UCI request and including an indication of information to be multiplexed with HARQ acknowledgement information; and operating (442 or 744) the base station to monitor for uplink control information including HARQ information from the UE.

Non-Transitory Computer Readable medium Embodiment 2 A non-transitory computer readable medium (1020) including computer executable instructions which when executed by a processor (1002) control a user equipment (UE) 1000 (e.g., using unlicensed spectrum) to perform the steps of: operating (810) the UE device to determine control information related to channel quality or channel occupancy to multiplex and transmit with HARQ acknowledgement information in response to a UCI Request, and wherein the PUCCH is on a carrier wider than 20 MHz.

The techniques of various embodiments may be implemented using software, hardware and/or a combination of software and hardware. Various embodiments are directed to apparatus, e.g., user devices such as a user equipment (UE) device, base stations such as a gNB or ng-eNB, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message generation, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station, including a processor configured to implement one, multiple or all of the steps of one or more methods of the invention.

In some embodiments, the processor or processors, e.g., CPUs, of one or more devices, e.g., communications nodes such as base stations or UEs are configured to perform the steps of the methods described as being performed by the communications nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a base station or UE including, with a processor which includes a component corresponding to each of the steps of the various described methods performed by the device in which the processor is included. In some but not all embodiments a device, e.g., communications node, such as a base station or UE, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a base station or UE. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a base station, a UE, a controller, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
    operating a user equipment (UE) to receive an uplink control information (UCI) request in a Physical Downlink Control Channel (PDCCH), said UCI request requesting transmission of Hybrid Automatic Repeat Request (HARQ) acknowledgment information for one or more previously communicated transmission segments identified by HARQ identifiers (IDs) included in the UCI request and including an indication of information to be multiplexed with HARQ acknowledgement information; and
    operating the UE to transmit HARQ acknowledgement information with the information to be multiplexed with HARQ acknowledgement information.

2. The communications method of claim 1, wherein said UCI request includes a request for a scheduling request (SR) to be multiplexed with HARQ acknowledgement information; and
    wherein operating the UE to transmit HARQ acknowledgement information with the information to be multiplexed with HARQ acknowledgement information includes transmitting a scheduling report multiplexed with HARQ acknowledgement information.

3. The communications method of claim 2, wherein said UCI request is a command that is received by the UE.

4. The communications method of claim 2, wherein said UCI request further includes a timing indicator indicating which slot of an uplink channel in which the requested UCI information is to be transmitted.

5. The communications method of claim 4, wherein said indication of information to be multiplexed with HARQ acknowledgment information is a Channel State Information (CSI) request indicating what information is to be multiplexed with HARQ acknowledgment information to be communicated in response to the CSI request.

6. The communications method of claim 5, wherein said CSI request is an indicator including 6 or fewer bits indicating format and content of the information to be multiplexed with the HARQ acknowledgment information to be communicated in a CSI report in response to the CSI request.

7. The communications method of claim 4, further comprising, prior to operating a base station to transmit said uplink control information (UCI) request,
    operating the base station to configure the UE with:
        i) a Physical Uplink Control Channel (PUCCH) resource set for delayed acknowledgment/negative acknowledgement (ACK/NACK) feedback; and
        ii) a look-up table for UCI multiplexing rules.

8. The communications method of claim 1, wherein said UCI request further includes indicators for activation of one of a plurality of configured grants.

9. The communications method of claim 8, wherein said UCI request includes both a request for a channel state information (CSI) report and a scheduling request (SR).

10. The communications method of claim 2, further comprising, prior to operating the UE to receive said uplink control information (UCI) request, operating the UE to receive:
   i) sets of Configured Grant Physical Uplink Control Channel (CG PUCCH) resource for delayed acknowledgment/negative acknowledgement (ACK/NACK) feedback; and
   ii) a look-up table for UCI multiplexing rules.

11. The communications method of claim 1, wherein a Physical Uplink Control Channel (PUCCH) is on a carrier wider than 20 MHz; and
   wherein said UCI request requesting transmission of HARQ acknowledgment information indicates one or more LBT sub-bands to be used for communicating the requested information.

12. The communications method of claim 11, further comprising:
   operating the UE device to determine control information related to channel quality or channel occupancy to multiplex and transmit with HARQ acknowledgement information in response to the UCI Request.

13. The communications method of claim 12, further comprising:
   operating the UE to transmit said determined control information related to channel quality or channel occupancy multiplexed with the HARQ acknowledgement information.

14. User equipment (UE) comprising:
   a wireless transmitter;
   a wireless receiver; and
   a processor configured to control the UE to:
      receive an uplink control information (UCI) request in a Physical Downlink Control Channel (PDCCH), said UCI request requesting transmission of Hybrid Automatic Repeat Request (HARQ) acknowledgment information for one or more previously communicated transmission segments identified by HARQ identifiers (IDs) included in the UCI request and including an indication of information to be multiplexed with HARQ acknowledgement information; and
      transmit HARQ acknowledgement information with the information to be multiplexed with HARQ acknowledgement information.

15. The UE of claim 14,
   wherein said UCI request includes a request for a scheduling request (SR) to be multiplexed with HARQ acknowledgement information; and
   wherein said processor is further configured to control the UE to:
      transmit a scheduling report multiplexed with HARQ acknowledgement information, as part of being configured to control the UE to transmit HARQ acknowledgement information with the information to be multiplexed with HARQ acknowledgement information.

16. The UE of claim 15, wherein said UCI request is a command that is received by the UE.

17. The UE of claim 15, wherein said UCI request further includes indicators for activation of one of a plurality of configured grants.

18. The UE of claim 17, wherein said UCI request includes both a request for a channel state information (C SI) report and a scheduling request (SR).

19. The UE of claim 17, wherein said indication of information to be multiplexed with HARQ acknowledgment information is a Channel State Information (CSI) request indicating what information is to be multiplexed with HARQ acknowledgment information to be communicated in response to the CSI request.

20. The UE of claim 14,
   wherein a Physical Uplink Control Channel (PUCCH) is on a carrier wider than 20 MHz; and
   wherein said processor is configured to control the UE to transmit the HARQ acknowledgement information with the information to be multiplexed with HARQ acknowledgement information on one or more LBT sub-bands indicated in the received UCI request to be used for communicating the requested information.

21. The UE of claim 15, wherein said UCI request is a command that is sent to the UE and wherein the UCI request further includes a timing indicator indicating which slot of an uplink channel in which the requested UCI information is to be transmitted.

* * * * *